United States Patent [19]
Gallagher

[11] Patent Number: 5,090,231
[45] Date of Patent: Feb. 25, 1992

[54] ELECTRONIC COMPASS SYSTEM

[76] Inventor: Lawrence W. Gallagher, 101 S. Belle Ave., Palatine, Ill. 60067

[21] Appl. No.: 413,950

[22] Filed: Sep. 28, 1989

Related U.S. Application Data

[63] Continuation-in-part of Ser. No. 255,355, Oct. 7, 1988, abandoned.

[51] Int. Cl.$^5$ .............................................. G01C 17/38
[52] U.S. Cl. ................................. 73/1 E; 364/571.05; 364/559; 33/356; 33/361
[58] Field of Search ........................................ 73/1 E; 364/571.01–571.08, 559, 449, 457; 33/356, 361, 362, 363 Q

[56] References Cited

U.S. PATENT DOCUMENTS

| | | | |
|---|---|---|---|
| 3,622,764 | 11/1971 | Brendes et al. | 364/571.02 |
| 3,683,668 | 8/1972 | Baker et al. | 73/1 E |
| 3,728,525 | 4/1973 | Adkar | 364/449 |
| 4,454,583 | 6/1984 | Schneiderhan et al. | 364/449 |
| 4,546,551 | 10/1985 | Franks | 33/356 |
| 4,720,992 | 1/1988 | Hormel | 73/1 E |
| 4,953,305 | 9/1990 | Van Lente et al. | 33/356 |

FOREIGN PATENT DOCUMENTS

| | | | |
|---|---|---|---|
| 87890 | 9/1983 | European Pat. Off. | 33/361 |
| 99713 | 1/1983 | Japan | 364/449 |
| 48811 | 3/1983 | Japan | 33/356 |
| 155311 | 9/1983 | Japan | 364/449 |
| 10116 | 1/1985 | Japan | 33/361 |
| 130311 | 6/1987 | Japan | 33/361 |

*Primary Examiner*—Tom Noland
*Attorney, Agent, or Firm*—Keil & Weinkauf

[57] ABSTRACT

A digital compass system for use in a wide variety of motor vehicle models, especially in the automotive aftermarket, and including various features which simplify installation and calibration by non-professionals. A knowledge of magnetic direction is not required. During calibration, only true geographic directions are used throughout. While searching for a suitable location within the vehicle to mount the magnetic sensor, the installer is advised by the digital display unit of the system as to whether or not a given location contains excessively strong magnetic components.

18 Claims, 14 Drawing Sheets

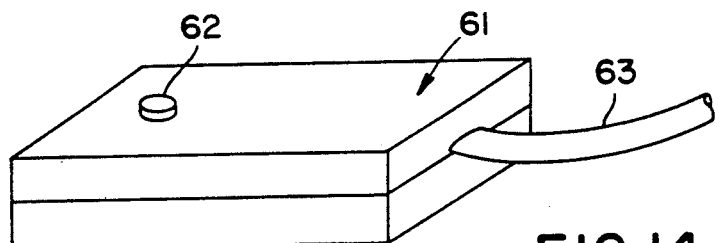
FIG. 14
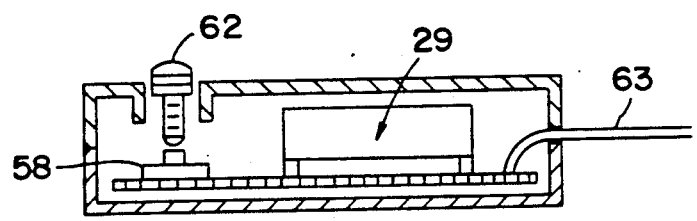
FIG. 15
FIG. 16
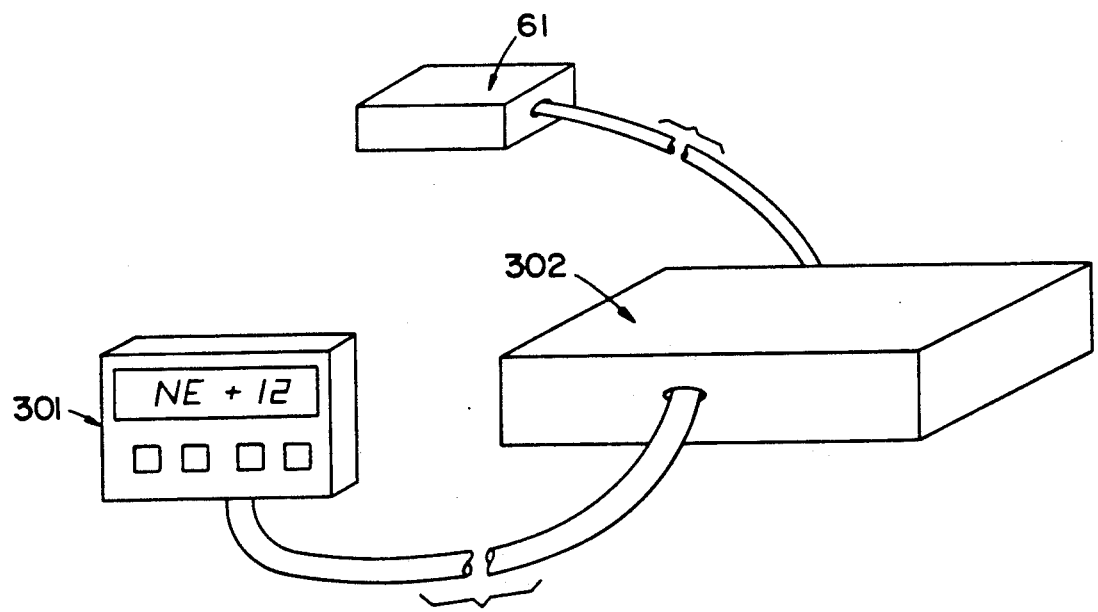

ELECTRONIC COMPASS SYSTEM

This application is a continuation-in-part of application Ser. No. 07/255,355, filed on Oct. 7, 1988, and now abandoned.

BACKGROUND OF THE INVENTION AND PRIOR ART

The invention relates to electronic systems for informing the operator of a motor vehicle of the current direction of travel.

Any such system must deal in some way with errors caused by the magnetic field of the vehicle chassis itself as well as with errors occurring due to naturally-occurring deviation between magnetic north and geographic north in different parts of the world.

Early mechanical compass devices in which the magnetic sensor consisted of a free-floating compass needle used small permanent magnets near the magnetic sensor whose direction or proximity could be manually adjusted in an attempt to cancel the permanent static magnetic field originating in the chassis near the sensor. These early devices which were intended for installation by the user were limited to mounting locations which are relatively free of chassis interference, such as the front windshield or the instrument panel. These mechanical compass instruments have served as the backbone of the automotive "aftermarket" (user installed compass devices) for several decades and remain the most widely used today.

During this time, the aircraft industry began using a radically different form of magnetic sensor that is now generally called a "Flux-Gate Sensor". It consisted of a toroidal-shaped magnetic core with a single primary winding which was driven with an alternating current. Two secondary windings were formed in linear fashion over the core subassembly and in quadrature with each other such that, in the absence of an external fixed magnetic field, the magnetic coupling from primary to secondaries would be balanced and the output voltage of both secondaries would be zero. Any external magnetic flux parallel to the plane of the toroid would tend to reinforce the alternating flux due to the primary current on one half of the toroid and counteract the alternating flux on the other half. The resulting magnetic unbalance produces an output voltage in either or both secondary windings. Output is a maximum when the external field direction is exactly perpendicular to a given secondary winding and becomes zero when it is exactly parallel. If the sensor is rotated by 180 degrees, both secondaries will present an equal output but of opposite polarity relative to the primary drive signal. If the sensor is aligned in the vehicle such that one secondary winding is parallel to the direction of travel, then that winding is designated as the east/west output and the other winding at 90 degrees is the north/south output. The two outputs can be interpreted as representing the E/W and N/S components of the earth's magnetic field and the actual heading angle computed using simple trigonometry.

The development of the Flux-Gate Sensor provided two major improvements over the floating, permanent magnet type:

1. The sensor could now be installed at a location different from the remainder of the system and connected by cable to the location of the other system components.

2. The two secondary windings could serve as electromagnets, magnets, effectively replacing the adjustable fixed magnets to cancel fixed chassis components. Small direct currents of proper polarity could be passed through both windings independently to oppose the chassis components of the vehicle.

At this point in time, the calibration process was still done manually much the same as in the case of the mechanical compasses except that user adjustment involved the setting of variable resistors instead of mechanical screws.

The first automotive aftermarket compass devices with a Flux-Gate Sensor which appeared about four years ago did not take advantage of its remote-mounting capability. This device consisted of a display/control unit mounted to the instrument panel just as before and a sensor unit on a short cable. The sensor was mounted on a horizontal surface of the instrument panel close to the windshield. The main unit included two adjusters to set secondary direct current. Direction of travel was displayed by a rotating disc controlled by a servo motor.

At this time microprocessor technology became widely used for automotive accessories such as the electronically-tuned AM/FM radio with digital display of station frequency and with favorite-station preset data stored in the non-volatile memory area of the microprocessor, such technology effectively replacing mechanical AM/FM tuners having station preset buttons. Following these lines, electronic compass systems also made their appearance in which in the calibration digital displays were used and in which the calibration procedure was automated by a microprocessor, with storage of the calibration result in a non-volatile memory. One such electronic compass system has been disclosed, for example, in U.S. Pat. No. 4,546,551, issued Oct. 15, 1985.

Compass devices using this technology appeared several years ago as factory-installed options in some new American cars. Their application has been strictly limited to one or two models whose configuration lends itself to a custom installation of a single package including sensor in a favorable location such as in the headliner just behind the windshield or as an attachment to the rear-view mirror. Typically, the compass option is only offered in vans or mini-vans.

All known digital compass devices currently available suffer from certain weaknesses that for all practical purposes prevent application to the aftermarket in which the end-user would purchase the device for his currently-owned vehicle and either install it himself or hire a professional installer whose expertise is likely limited to car stereo, burglar alarms and radar detectors. Among these weaknesses are:

1. The calibration procedure requires that the vehicle be prealigned to magnetic north rather than true geographic north. As a factory-installed option, the new car dealer might easily have alignment markers painted on his premises and perform the calibration before delivery. The aftermarket customer has no knowledge of magnetic direction in his area and is faced with the prospect of buying a conventional compass and then trying to align his sixteen foot vehicle to a one inch needle.

2. Workable sensor locations are limited to the windshield or roof area where chassis components are known to be low-typically less than the magnitude of the earth's magnetic field. In the context of a factory-installed option available in only a few limited models, such locations are satisfactory because the hardware can be integrated into the car interior for a pleasing cosmetic effect and the location is also convenient to the operator and passengers. Such desirable locations are generally not available to a viable aftermarket compass for a variety of reasons—both cosmetic and functional. The sensor must be rigidly fixed in a horizontal plane with the secondary winding axes properly aligned to the vehicle. Any movement after calibration destroys its validity. This eliminates the possibility of clipping the sensor to the sunvisor as commonly done with radar detectors. The sensor could be fixed to the top surface of the instrument panel as done previously but this location is subject to interference from other on-board electrical systems or cables and is generally unsightly.

OBJECTS AND SUMMARY OF THE INVENTION

It is therefore a primary object of the invention to provide an electronic compass system for motor vehicles which avoids the foregoing drawbacks.

It is a more particular object of the present invention to provide a high-performance vehicular compass system employing a microprocessor, and preferably a digital display unit and control switches, that can be applied to a wide variety of vehicle models without restrictions —in short, an aftermarket electronic compass system.

Another object of the invention is to provide an electronic compass system which simplifies installation and calibration by non-professionals and, particularly, permits installation in vehicle locations previously considered unworkable for a compass device.

With the foregoing and other objects in mind the invention, briefly, consists in a compass system for use in the automotive aftermarket in any of a wide variety of vehicle models, this system comprising a static magnetic sensor, digital display means, a plurality of manual control means, and circuit means having memorymeans associated therewith, these circuit means interconnecting the static sensor and the display and control means, and the circuit means including means which, in a four-step calibration procedure, are responsive to the actuation, upon prealignment of the vehicle, in one of the steps, in the corresponding major true geographic heading, of one of the control means to initiate the corresponding step of the calibration procedure, each step following the first step refining the calibration, and means responsive to the successful completion of the final step, to cause the circuit means to transmit to the display means a signal indicative of the angle of apparent deviation between geographic heading and magnetic heading in the given geographic location, and store the apparent deviation in the memory means so that, during subsequent operation of the system in indicating the direction of travel, any direction indicated by the display means is automatically corrected by this angle.

Among the other features of the invention is the provision of means which upon receipt of an overload test command signal, are responsive to the fixed magnetic components of the vehicle chassis exceeding the calibration capabilities of the system, to transmit an overload signal to the digital display means, the display means including an overload indicator activated in response to this overload signal, whereby the installer of the system, in searching for a desirable location for the sensor within the vehicle, is advised of the non-suitability of the attempted location.

Yet another feature of the invention is the provision of means responsive to actuation of predetermined manual control means to cause the display means, irrespective of whether or not a sensor is connected up, to sequentially display each of the eight geographic headings, thereby to demonstrate to an observer the functional capability of the display means.

BRIEF DESCRIPTION OF THE DRAWINGS

The foregoing and other features of the invention some of which are equally applicable to electronic compass systems for the "original equipment market", will become apparent from the description of preferred embodiments of the invention, this description being given hereinafter with reference to the accompanying drawings, in which:

FIG. 14 is a schematic perspective view of the sensor unit;

FIG. 15 is a lengthwise cross-sectional view of the sensor unit; and

FIG. 16 is a perspective view of an alternative packaging arrangement for the individual components of the electronic compass system according to the invention.

DETAILED DESCRIPTION OF THE PREFERRED EMBODIMENTS

Figure 1:
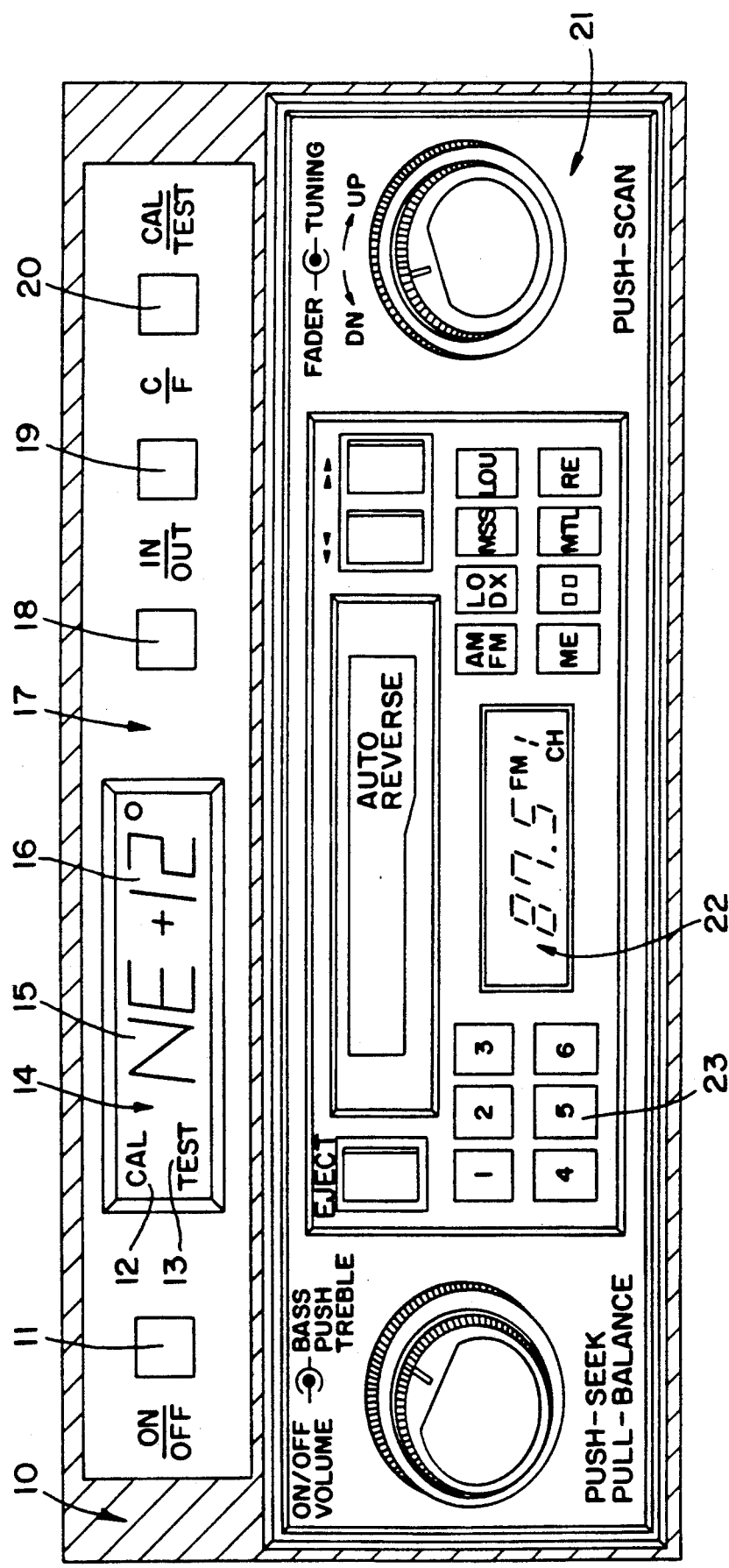
FIG. 1 is a front view of a typical aftermarket installation kit containing a typical car radio model together with a display/control unit embodying the present invention.

FIG. 1 shows a front view of a typical automotive aftermarket installation kit 10 in which a typical aftermarket radio/tape player 21 has been installed along with the main chassis 17 of the present invention, this main chassis conforming dimensionally to the industry standard Half DIN E package. The entire assembly can then be installed directly into the vehicle instrument panel in the space formerly occupied by the original factory-installed radio/tape player. This method is conventional to the extent that any vehicle owner wishing to replace the original radio with a higher featured aftermarket radio can also purchase a kit specifically designed to adapt the new radio to the mounting requirements of his particular vehicle. If the owner also wishes to add another audio component such as a graphic equalizer and further prefers it to be installed in-dash along with the radio 21 for cosmetic reasons, then he can purchase an equalizer or other audio accessory already configured in the Half DIN E package and specify an installation kit to accept both units together.

The radio 21 shown in FIG. 1 represents a typidal electronically-tuned AM/FM radio with digital display and favorite station preset buttons. Such devices always include a microprocessor controller with a protected RAM area containing the user's station selections. This RAM is protected by means of a power connection directly to the vehicle battery so the contents are not lost when the vehicle ignition is shut off. Two other power connections are required—ground and +12 volts that is switched on with the ignition key. The power requirements for the main unit of the present invention 17 are exactly the same in that a direct battery connection is also required to preserve binary data compiled during the calibration procedure. It follows that the electrical installation of the main unit is simplified in that all three power connections can be made directly to those already provided for the radio.

The front panel of the main unit 17 is shown to include a liquid-crystal display 14 which includes two alpha characters 15 wherein the first character can be either "N" or "S" and the second character "E" or "W" such that any one of eight major or minor headings can be displayed. This display method is appropriate for a compass system not intended for point-to-point navigation purposes but only to alert the vehicle operator of any significant error between the actual and intended direction of travel. The display also includes two graphic indicators or symbols "CAL" 12 and "TEST" 13 and a numeric section 16 to display apparent magnetic declination up to +/−40 degrees.

FIG. 1 also shows a total of four control buttons, only two of these being directly related to the control of the compass system itself. They are ON/OFF (also referred to as the Display button) 11 used to turn the entire display 14 on or off and CAL/TEST 20 which is used both individually or in combination with other buttons for a variety of functions including a user request to display calibration status as well as the performance of the calibration itself. The other two buttons labeled IN/OUT 18 and C/F 19 perform secondary functions related to compass operation or diagnostic procedures; they may, if desired, also be employed for purposes, not disclosed herein, which are unrelated to the operation of the compass system proper.

Figure 2:
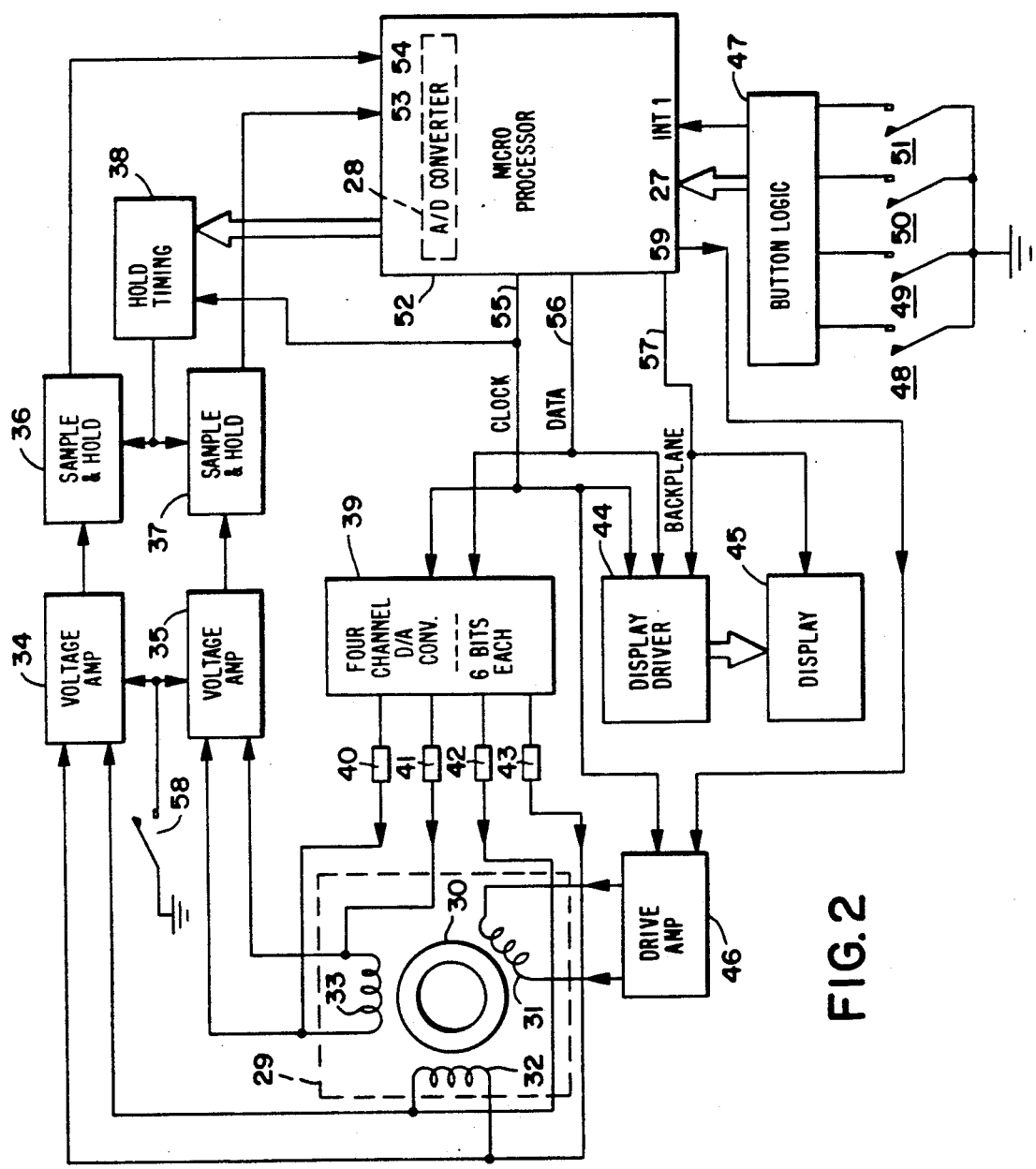
FIG. 2 is a simplified functional block diagram of a system embodying the present invention.

FIG. 2 shows the major functional blocks comprising the electrical system of the present invention. The magnetic sensor 29 is housed in a small plastic package 61, FIGS. 14,15 and connected to the main unit 17, FIG. 1, by a cable 63 of sufficient length in the order of, say, 12 feet, to reach any point in the cabin area and having a flat cross-section to facilitate dressing under carpeting or trim. The plastic housing also includes a push switch 62 for use by the installer while searching for a good location for the sensor. If the current location is unsuitable, the display will signal a warning, all as disclosed hereinbelow.

The magnetic flux-gate sensor is shown pictorially as consisting of a toroidal magnetic core 30 with a primary excitation winding 31 and two secondary output windings 32 and 33. For the purpose of definition, the vehicle direction of travel is considered to be towards the top of the page. Accordingly, output coil 33 is designated as the North/South output and coil 32 as the East/West output. A positive-going output from coil 33 will be interpreted as a North vector and a positive-going output from coil 32 as a West vector. Coils 32 and 33 are coupled to the inputs of voltage amplifiers 34 and 35, respectively. The gain factor of the voltage amplifiers is set to 10 db during normal operation in order to establish a nominal relationship between a given magnetic field strength and the resulting binary-converted value used by the microprocessor 52 to compute a heading. The output signals from coils 32 and 33 consist of pulses having short duration and attack times such that the voltage amplifiers must have a slew rate of at least 12 volts per microsecond to avoid distortion of the pulse shape. When gain control switch 58 is closed by the installer, the gain factor of voltage amps 34 and 35 are automatically reduced from 10 db to 4 db in order to compress the relationship between field strength and binary-converted value.

The outputs of voltage amplifiers 34 and 35 are coupled to the inputs of sample and hold circuits 36 and 37, respectively. Their purpose is to switch from sample-to-hold mode at a predetermined time known to be coincident with the sensor output pulses reaching a peak positive- or negative-going value and to hold these values at their respective outputs for an extended period of time while applying these outputs to A/D (analog to digital) input ports 53 and 54 of the microprocessor 52. In the preferred embodiment the microprocessor is a Motorola MC6805S3 device which includes a four-channel, 8 bit Analog-to-Digital Converter indicated by reference numeral 28 in FIG. 2. Input ports 53 and 54 represent two of these four corresponding ports. The remaining two ports are used to process additional signals from other areas. The microprocessor requires 25 microseconds to complete one conversion so the sample and hold circuits must hold their respective peak values for at least 50 microseconds while both the N/S and E/W signals are converted to a hexidecimal value i the range of $00 to $FF (in decimal terms 0–255).

The output signal of a hold timing circuit 38 is coupled to control inputs of the sample and hold circuits 36 and 37 such that hold mode is asserted when the output signal switches from logical high to low. Hold timing circuit 38 is controlled in turn by a combination of three timing signals originated by the microprocessor under program control.

FIG. 2 also shows a four-channel digital-to analog converter 39 in which each channel has a six bit resolution and which in the preferred embodiment is a Motorola type MC144111 device. Accordingly, the output of each channel can be set independently to any 1 of 64 known voltage levels by inputing a serial data stream consisting of 24 bits totally. Two channel outputs are directly coupled to the N/S sensor secondary 33 through resistors 40 and 41 and the other two channel outputs to E/W secondary 32 through resistors 42 and 43. All four resistors have an equal value being nominally 20 times larger than the d.c. resistance of the secondary windings which are typically 40 ohms. If each of the four 6 bit registers in D/A converter 39 is preset to a default value of $1F (decimal 31), then all four channels will adopt equal output voltages that are half way between 0 volts and V max which in the preferred embodiment is 8 volts and no direct current will be injected into sensor windings 32 and 33. However, if the D/A register associated with resistor 40 is incremented to a value $20 (decimal 32) and the register associated with resistor 41 is decremented to $1E (decimal 36), then a small direct current will flow from resistor 40 through winding 33 and exit through resistor 41. Each of the two registers comprising one pair associated with one sensor winding can be set to any value between $00 and $3F (decimal 63) via a serial data stream originated by the microprocessor. If each register value in a pair is chosen to be the $1F (decimal 32) compliment of the other, it can readily be seen that the D/A channel pair combined with resistors 40 and 41 comprises a digitally-controlled current source to sensor winding 33 in which winding current can be set to any of 31 predetermined values and can further be set to flow in either direction, such current serving to generate a fixed magnetic flux through sensor toroid 30 that is orthogonal to the sensor secondary coil winding and has predetermined strength and direction. It follows that a discrete value and direction of generated flux can be found that will effectively cancel the associated component of a fixed magnetic flux originating in the vehicle chassis at the chosen location for the sensor. The second pair of D/A channels are applied in identical fashion to the E/W sensor winding 32 such that both orthogonal components of the fixed chassis flux which may have any direction relative to the chassis itself can be canceled. This assumes, though, that the chassis field strength does not exceed the maximum opposing field strength which can be generated when a given D/A register pair is set to the maximum offset of $00 and $3F (decimal 63). It should be noted that the maximum field strength available can be readily increased by reducing the values of resistors 40 through 43 but this also results in a loss in calibration precision since only 31 steps in either direction are available. Other embodiments of the present invention might employ D/A converters having 8 bit resolution to overcome this limitation. Resistor values of 1000 ohms were chosen for the preferred embodiment.

FIG. 2 also shows the microprocessor 52 as having two output signals labeled Data 56 and Clock 55 which are utilized by a number of other circuits. The MC6805S3 microprocessor also includes a Serial Peripheral Interface (SPI) to facilitate the transmission of binary data to external devices which require a serial data format. This includes the D/A converter 39 and also the Display Driver 44 which in the preferred embodiment is a Motorola MC145453 type device intended to drive liquid crystal display 45. Accordingly, the Clock and Data output lines are used to send binary data to D/A converter 39 during the calibration procedure and to display driver 44 during normal operation when a display update is to be performed. The clock signal can be readily set to a wide range of frequencies under program control and its output duty-cycle is inherently 50%. This property makes it well suited to a third application viz. the generation of the excitation signal to the flux-gate primary winding 31 after amplification by drive amp 46, the latter comprising a wave form generator. The benefit of this arrangement goes beyond the economy of eliminating a separate oscillator. As noted, the clock signal is generated by the processor such that its state at any instant in time can be readily monitored under program control to determine if it is currently high, currently low, just changed state or just about to change state. Given that the output pulses of sensor coils 32 and 33 are nearly but not exactly coincident with the rising and falling edges of the excitation drive signal, the real benefit is that it allows for the design of simple yet reliable external circuitry to extract the direction-bearing portion of the sensor secondary output wave forms by making extensive use of supplementary processor output signals which are derived from the clock signal under program control and, as described below, serve to efficiently set the transition from sample to hold mode with minimal external parts.

The microprocessor also includes an 8 bit I/O (input-/output) port. Four of these ports, designated 27 are programmed as inputs and monitor the status of four control switches 48 through 51 via a button logic circuit 47. These switches correspond to the four control buttons 11, 18, 19 and 20 shown in FIG. 1. If any switch is closed, the button logic generates an interrupt signal INT 1 to the processor which responds by noting which switch or switches are currently closed and then takes appropriate action. The other four ports are programmed as outputs and comprise the supplementary output signals referred to above which serve to control various external circuits as noted. One of these outputs 59 is used to gate the drive amplifier 46 on and off at predetermined times to facilitate the overall data acquisition process.

FIG. 2 shows another processor output signal 57 labeled BACKPLANE. This output port is similar to the clock output in that frequency can be set by program control and the wave form has a duty cycle that is inherently 50% because switching time is set by an internal timer which can be preset to a starting value that is the same for both halves of one cycle. It is well known that LCD type displays require a drive signal of 50% duty cycle to avoid any net DC component which would shorten useful display life. Accordingly, this additional resource that is included in the MC6805S3 processor has been utilized to provide the backplane drive function. In the preferred embodiment, backplane frequency has been set to 100 Hz.

Figure 3:
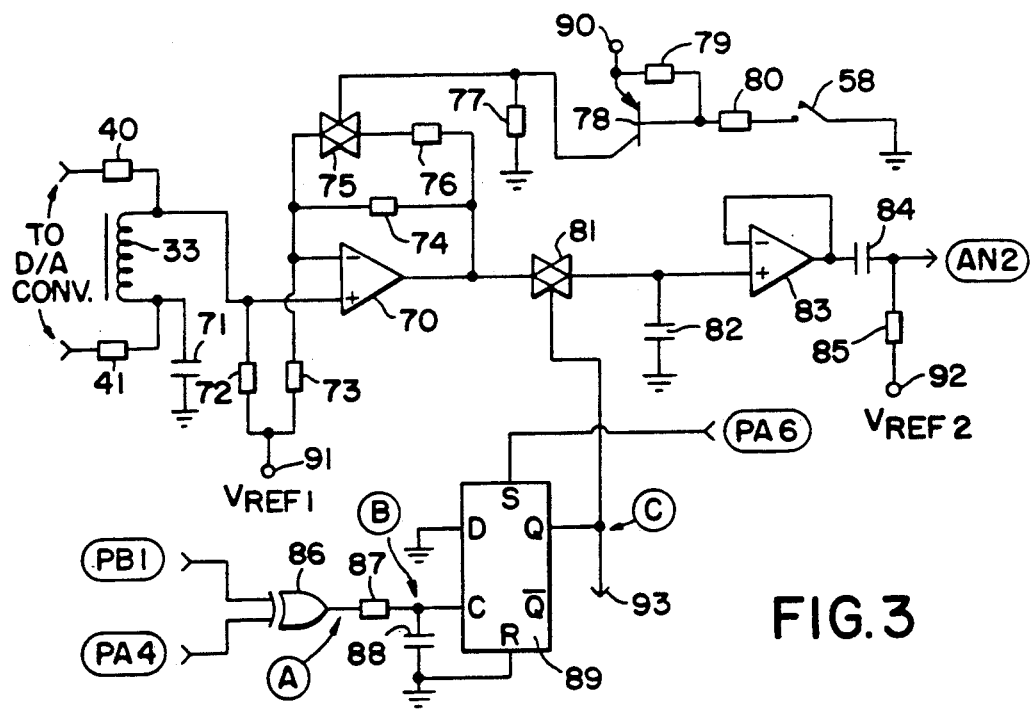
FIG. 3 is a partial detailed electrical circuit diagram of the system embodying the present invention.

FIG. 3 is a detailed circuit diagram including three of the circuit blocks shown in FIG. 2. Circuit parts 70 through 80 correspond to the voltage amplifier 35 in FIG. 2. Circuit parts 81 through 85 correspond to the sample and hold circuit 37 in FIG. 2. Circuit parts 86 through 89 correspond to the hold timing circuit 38 in FIG. 2. Reference symbols contained within an oval represent direct connections to various microprocessor output or input ports as defined by Motorola in the MC6805S3 Data Book. The circuit of FIG. 3 shows only the voltage amplifier and sample/hold circuit for one of two channels—in this case the North/ South channel in which the input signal is the sensor N/S output 33 and the processed output is applied to microprocessor A/D input AN2 which corresponds to 53 in FIG. 2. The circuitry to process the East/West sensor output is identical; therein the input signal is sensor output 32 and the output is applied to another A/D input port AN3 which is 54 in FIG. 2. The sample/hold circuitry is common to both channels.

In the preferred embodiment, active devices 86 and 89 are powered by a 5 VDC supply in order to match the microprocessor logic levels. Active devices 70, 75, 81 and 83 are powered by an 8 VDC supply to better handle the analog signals from sensor output 33 which may have a wide dynamic range. Accordingly, operational amplifier 70 is set to idle at 4 VDC by Vref1 coupled through resistors 72 and 73. One side of output coil 33 is directly coupled to the non inverting input and the other side is AC coupled to ground through capacitor 71. If gain control switch 58 is open, then transistor 78 is cut off by resistor 79 and the control input of transmission gate 75 will be at ground potential via resistor 77 causing the gate to be in a high impedance state. In this condition, voltage gain is set by the values of resistors 74 and 73 and it corresponds to the higher gain state for normal operation. If switch 58 is closed, transistor 78 is turned on via resistor 80 and it applies the 8 VDC supply 90 to the control input causing the gate to assume a low impedance state; in this condition resistor 76 is effectively in parallel with resistor 74 such that voltage gain is now reduced. In either case, the output of amplifier 70 is directly coupled to the input of transmission gate 81 whose output drives storage capacitor 82 and the non-inverting input of buffer amplifier 83; in this fashion the buffer is set to unity gain and its output is coupled to DC blocking capacitor 84 such that the final output coupled to AN2 can have a new and lower average DC level Vref2 92 as coupled by resistor 85. AN2 is an input to A/D converter 28 included in the microprocessor; it is powered by a 5 VDC supply such that any applied analog input signal must be in a range of 0 to +5 volts. Accordingly, Vref2 is set to 2.5 VDC in the preferred embodiment to center the analog input to this range.

The state of transmission gate 81 is controlled by the Q output of Flip/Flop 89. Sample mode is asserted when this output 93 is high causing the gate to be in a low impedance state such that the entire output signal of amplifier 70 is passed through to storage capacitor 82 and to AN2. When output 93 switches low, the gate assumes a high impedance state such that the signal level that existed at the instant of switching is held as a stored charge on capacitor 82 and a corresponding steady voltage level is applied to AN2 but now referred to Vref2 instead of Vref1.

Figure 4:
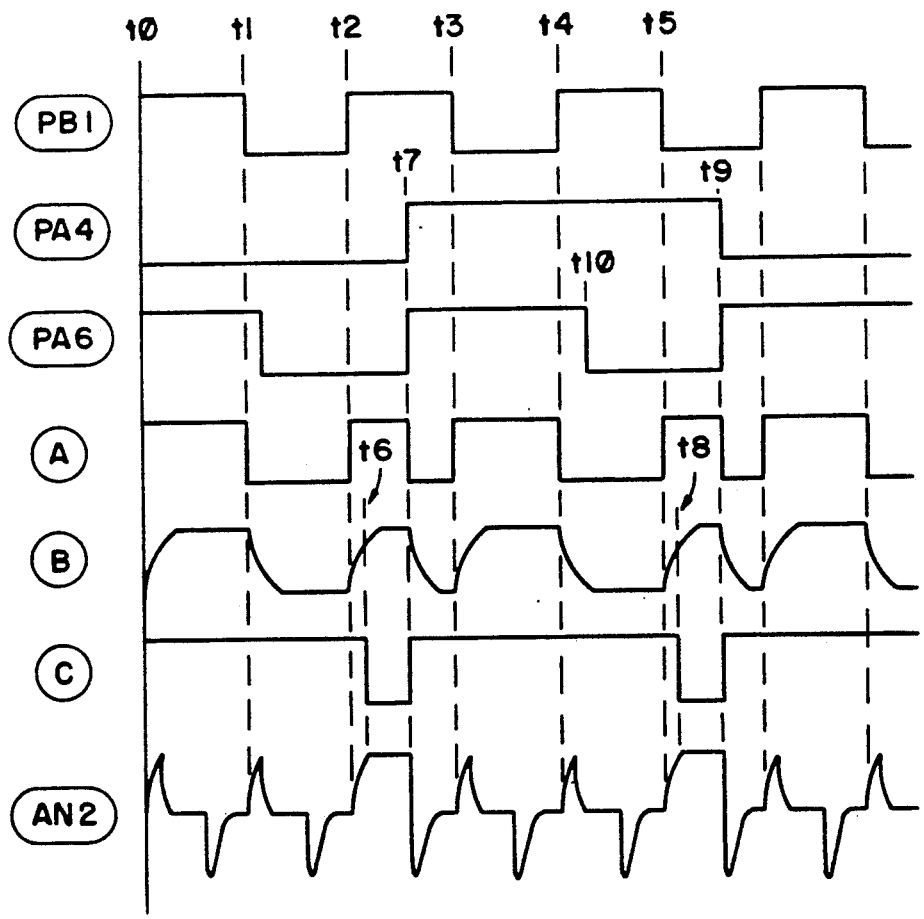
FIG. 4 is a pulse chart showing timing wave forms which clarify the operation of the circuitry contained in FIG. 3.

The transition of Q output 93 from high (sample) to low (hold) is controlled entirely by three signals generated by the microprocessor—PB1, PA4 and PA6. FIG. 4 illustrates the timing relationships between these signals and shows how they interact with the external circuit comprising the hold timing circuit in order to capture the peak value of the sensor signal at the instant it occurs. PB1 in FIG. 3 is one and the same with the CLOCK signal 55 in FIG. 2 and is further used to drive the sensor toroid winding 31. The useful portion of the are initiated at times coincident with both the rising and falling edges of the toroid drive signal. This behavior is inherent in flux-gate sensors having square-wave excitation. These times are indicated as t0 through t5 in FIG. 4. Wave form AN2 between t0 and t2 shows the actual structure of a sensor output signal wherein pulses indicating direction occur at t0 and t1 and have the same polarity—in this case positive-going to represent a north vector. Between t0-t1 and t1-t2 are shown second pulses of reverse polarity which are generated by the collapsing magnetic field resulting from saturation of the toroid core. Their position is not fixed in time and will vary with drive current levels. They are ignored by the processor.

While the useful pulses begin at t0, t1, etc., they do not reach peak values until after a short time delay which is determined by the inductance of the toroid primary winding and drive amplifier 46 parameters. In the system of the preferred embodiment, this delay is five microseconds and is indicated as interval t2-t6 and t5-t8 in FIG. 4. The Hold Timing circuit allows for this delay by interposing a charging network consisting of resistor 87 and capacitor 88 between the output of exclusive-OR gate 86 and the Clock input of F/F 89. As shown, PB1 is applied to one input of gate 86 and is passed through unchanged to the output (Point A) provided that the other gate input is held low by PA4 as it is from t0 to t7. F/F (flip-flop) 89 always transfers the logic level at Data input D to output Q on the rising edge of clock input C provided that Set (S) and Reset (R) inputs are both held low. If Set is held high by PA6, then Q is also held high and Sample mode is asserted. PA6 is set low by the processor when it is ready to begin a data acquisition cycle. This enables the F/F to respond to the next rising edge of the clock input by setting Q low since the Data input is grounded. The time constant of charging circuit 87,88 is set to five microseconds to match the known time delay. The F/F is a CMOS device which recognizes a logical high input when it has reached two-thirds (approximately one time constant) of the supply voltage as indicated on wave form B at t6. The result is that the transition from Sample to Hold is delayed 5 microseconds beyond the rising edge of PB1 at t2. Hold mode continues while the processor completes the A/D conversion for both channels. It then terminates Hold mode by setting PA6 high again at t7 and the second half of the acquisition cycle begins immediately as the processor now sets PA4 high—effectively transforming the exclusive-OR gate from a non-inverting buffer to an inverting buffer. The cycle then repeats except that Hold mode begins at t8 5 microseconds after the falling edge of PB1 at t5.

Wave form AN2 reflects the output signal of an ideal flux-gate sensor in which the peak pulse values are the same for both the rising (t0) and falling (t1) edge of the drive signal. In such a case, the double sampling method described above would be redundant. In actual practice, a given sensor sample will have winding imperfections that could, for example, cause the positive-going pulses at t0 to be stronger than shown and the pulse at t1 weaker than shown (less positive). The difficulty is that if the sensor is rotated 180°, both pulses will become negative-going but the pulse at t0 will now be weaker (less negative) than shown and the pulse at t1 stronger (more negative). If one relied on data samples taken only at t0 or t1, the result would be serious error when facing to the East or West. The data acquisition system of the present invention overcomes this sensor imperfection by double sampling and computing the arithmetic average in the microprocessor, this average then being used to compute the actual heading.

The circuit details of D/A converter 39, display driver 44, display 45, drive amplifier 46 and button logic as defined in FIG. 2 are conventional and are readily implemented by following the manufacturer's data sheets.

OPERATION

As mentioned above, the system according to the invention contains an over-load test function which, in the installation of the system, is of assistance to the installer in his search for a suitable location of the sensor unit within the vehicle. For this purpose, the sensor unit which is designated by reference numeral 61 in FIG. 14 contains, in addition to the flux-gate sensor 29, FIG. 2, a push button 62 for actuating over-load command switch 58 which is shown in FIGS. 2 and 3. In the operation of this over-load test, if the Test symbol 13 of display unit 17, FIG. 1, is lit, the installer knows that the current location of sensor unit 61 contains rather strong fixed magnetic components that may still be within the operating capability of the calibration system. The installer can then press push button 62 in the sensor housing to close switch 58. If the Test symbol now turns off, the installer is advised that the location in question is acceptable. If the Test symbol stays on, another location must be found. The operation of the microprocessor in processing the signals involved in the overload test will be discussed later in this section.

An important aspect of the invention is a four-step calibration procedure involving prealignment of the vehicle to true north, true west, true south and true east. The action taken by the processor is different for each step but, from the user viewpoint, each step is identical to every other except for the direction itself.

A short summary of the calibration procedure will first be given, followed by a more detailed explanation of this procedure with the aid of the flow diagrams of FIGS. 5 to 12.

Before starting calibration, the CAL symbol 12 in FIG. 1 will be on steadily. This informs the user that the system is totally un-calibrated and any indicated direction should be ignored. He then presses the CAL/TEST button 20 whereupon the direction display 15 shows "N" unconditionally and the "CAL" symbol 20 blinks. He has now been informed that the current step involves prealigning the vehicle properly on a street known to run in a true N/S direction. Having done so, the CAL button is pressed again and an automatic procedure is carried out after which normal operation is resumed. The "CAL" indicator is now off so the user is assured that at least one step has been performed and the indicated direction bears some validity. The actual accuracy after performing CAL N depends largely on the amount of magnetic declination at this location. If it is nearly zero, accuracy could be within +/−10 degrees already. The user has been advised via the owner's manual that the calibration sequence is N, W, S and E. If he now presses CAL again, the display will show W and the "CAL" symbol blinks again. He has now been informed that CAL W is next and this is step 2 of 4. If he wishes to perform this step now, he can align the car on a known east/west street and press CAL again. If he was merely curious regarding current calibration status, he then presses the ON/OFF button 11 and normal operation is resumed. The user is free to complete the full, four-step calibration at his convenience, each step further refining system accuracy. He can press the CAL button at any time to see how many steps, if any, remain to be done. At the conclusion of the final CAL E step, the display responds in a unique manner. Having compiled data taken during the four steps, the processor has now computed the apparent declination (deviation between magnetic north and true north) and now displays this + or− value in degrees in area 16 in FIG. 1 for three seconds before resuming normal operation. The user has been informed via the owner's manual what the nominal declination is for his location and he can now compare that value with the displayed value for agreement. If each step was carefully performed, in particular if the vehicle was well aligned to each major heading and was resting on level ground, agreement should be quite close within +/−3 degrees. A larger error alerts the user that recalibration is advisable. If the same result is displayed after several attempts, the user is then alerted to check sensor placement for possible tilt or rotational errors relative to the vehicle.

After full calibration, the user may press CAL/TEST at any time and the display will again show the declination angle for 3 seconds. This serves to confirm that the calibration has not been changed since the last check. This system behavior is also the basis for the data security provision. The calibration process of the present invention is a "closed" system in that it has a definite beginning and a definite end. After completion, no further calibration inputs will be accepted. In order to initiate a new calibration sequence, the array of control buttons must be operated in a complex order that would not be obvious to a casual operator. The steps are 1. Turn display off.
2. Press and hold CAL/TEST 20.
3. Press and hold C/F 19.
4. Press ON/OFF 11.

The entire protected RAM of the microprocessor is then cleared, forcing a cold start.

In this fashion, if the user determines the displayed apparent deviation to be in excessive disagreement with the actual deviation, known to him, in the given geographic location, he can initiate repetition of the calibration sequence by actuating the control means in the foregoing complex combination.

Figure 5:
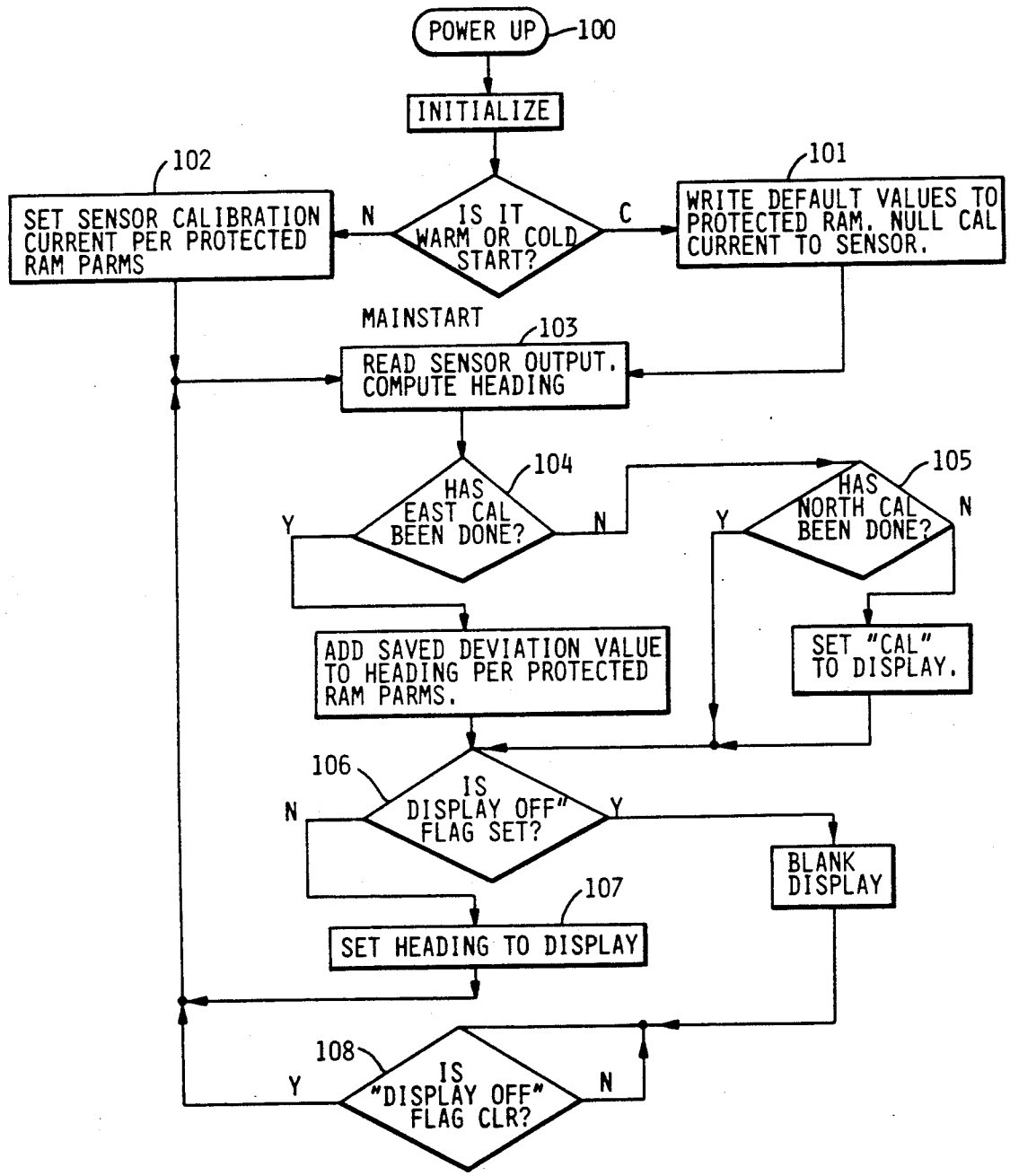
FIGS. 5 through 12 are flow diagrams of the programming for a microprocessor included in one embodiment of the present invention.
Figure 6:
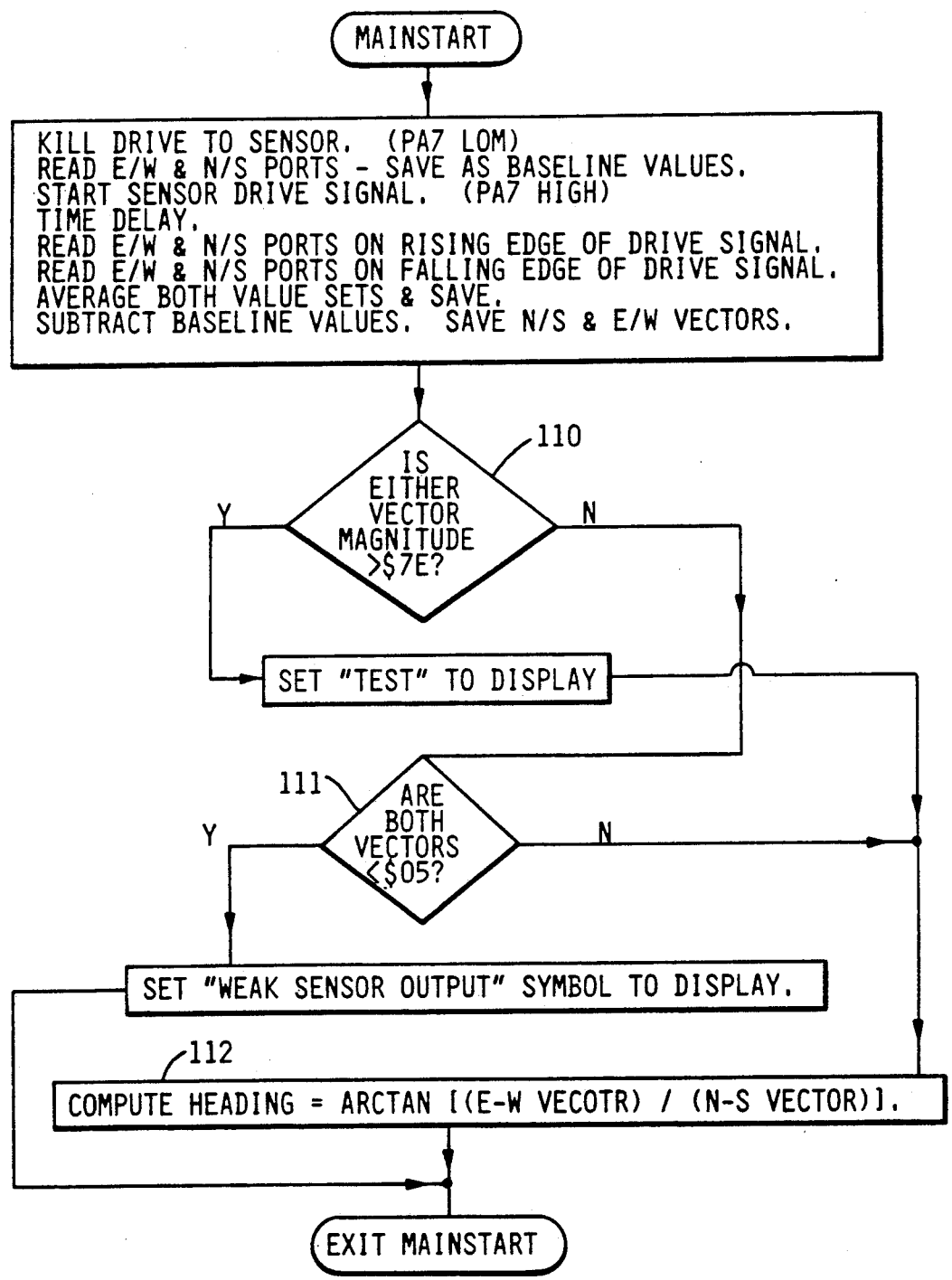
Figure 7:
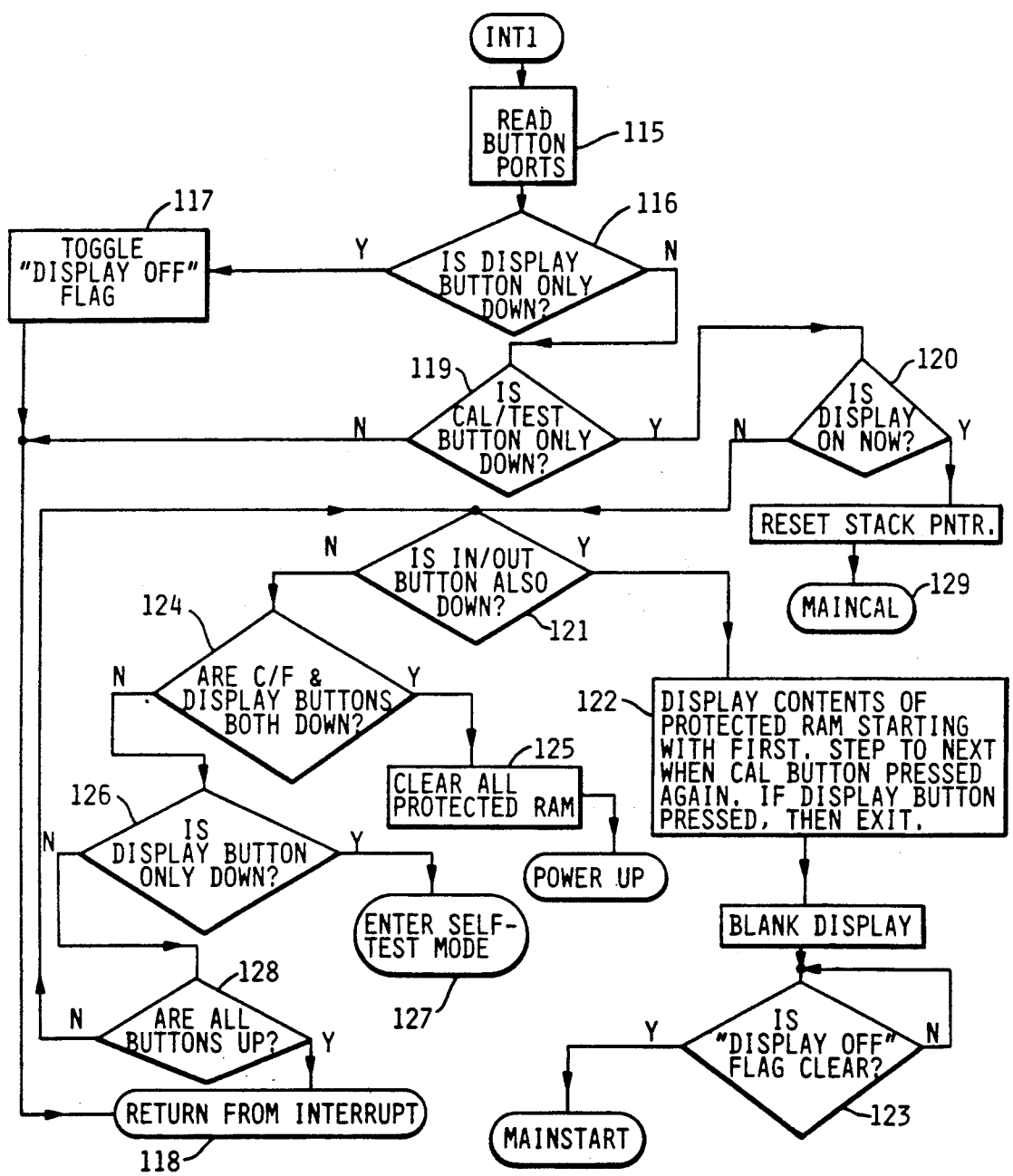

FIGS. 5 through 12 contain simplified flow diagrams of the microprocessor programming used in the preferred embodiment. FIG. 5 contains the basic program loop that runs continuously whenever the vehicle ignition switch is on. POWER UP, shown at 100, is entered when primary power is applied to the main unit 17. All I/O ports are initialized and the CLOCK 55 and BACKPLANE 57 output frequencies are established. The program then tests the contents of the protected RAM to determine if it contains valid data or not by checking the values of two bytes which are reserved exclusively for this purpose. If data is invalid as it would be after initial installation, a cold start 101 is initiated in which predetermined values are written to the protected RAM that correspond to a zero DC current in both sensor output coils 32,33. A short data burst containing these predetermined values is then output to the D/A converter 39 via CLOCK 55 and DATA 56 to set each of the four channels to their midpoint which results in a current null condition. The four calibration status flags are cleared and the "Display Off" flag is set. This latter step causes the display to remain off until turned on by the operator using ON/OFF button 11. Finally, the correct values are written to the two test bytes to avoid a future cold start at the next POWER UP. If RAM data is found valid, a warm start 102 is initiated in which the existing byte values that control sensor coil current are output to the D/A converter to re-establish the compensation state that existed when the ignition switch was last turned off. In either case, MAIN-START 103 is entered whose function is to acquire and analyze the sensor output signals. This is further detailed in FIG. 6.

Upon acquisition of the N/S and E/W vectors which can have any value in the range of +/−$00 to $7F (decimal 127) after A/D conversion, the magnitude of each vector is tested as shown at 110 to see if it is at the maximum possible value of $7F (decimal 127). If yes, the TEST symbol 13 is set to the display to alert the installer that the sensor location contains a rather strong fixed magnetic field. The gain of voltage amplifiers 34,35 have been set such that vector values in the range of +/−$00 to $30 (decimal 48) would result if the sensor was set in open space free of any interference. The region between $30 (decimal 48) and $7F (decimal 127) represents the linear headroom of the system to accommodate regions where the earth's field is stronger than average. Both vectors are tested again, at 111, to assure that the magnitude of at least one vector is greater than $05 (decimal 5). If not, it indicates either that the vehicle is passing through a location where the earth's field has been diverted by a large magnetic structure (steel bridge, etc.) or the sensor is defective or disconnected. In either case, a "Weak Sensor Output" symbol is set to the display in place of the normal direction characters 15, this symbol consisting of three horizontal bars in the preferred embodiment. Having passed this test, a heading is now computed by triangulation of the two vectors in a conventional manner and MAINSTART is exited.

Referring back to FIG. 5, calibration status is then checked, at 104, to see if CAL EAST has been done. If yes, the system is fully calibrated and there will exist in the protected RAM a computed declination angle value which is to be added to all headings to account for the difference between magnetic and true direction. Prior to full calibration, this value is not known. If no, the program checks, at 105, if the first step CAL NORTH has been done. If not, the "CAL" symbol is set to the display to alert the user that the indicated direction may be quite invalid. Before actually sending a direction to the display, the processor checks, at 106, if the "Display Off" flag is set. If yes, it means the display has not been turned on yet or deliberately turned off by the user. The program then enters a wait state, at 108, after blanking the display. If the display is on, then the heading value is converted, at 107, to one of eight possible directions, N, NW, W, etc., and a data burst is output to the display driver 44 via the CLOCK 55 and DATA 56 outputs comprising a display update. MAINSTART is then re-entered to start a new cycle.

Figure 8:
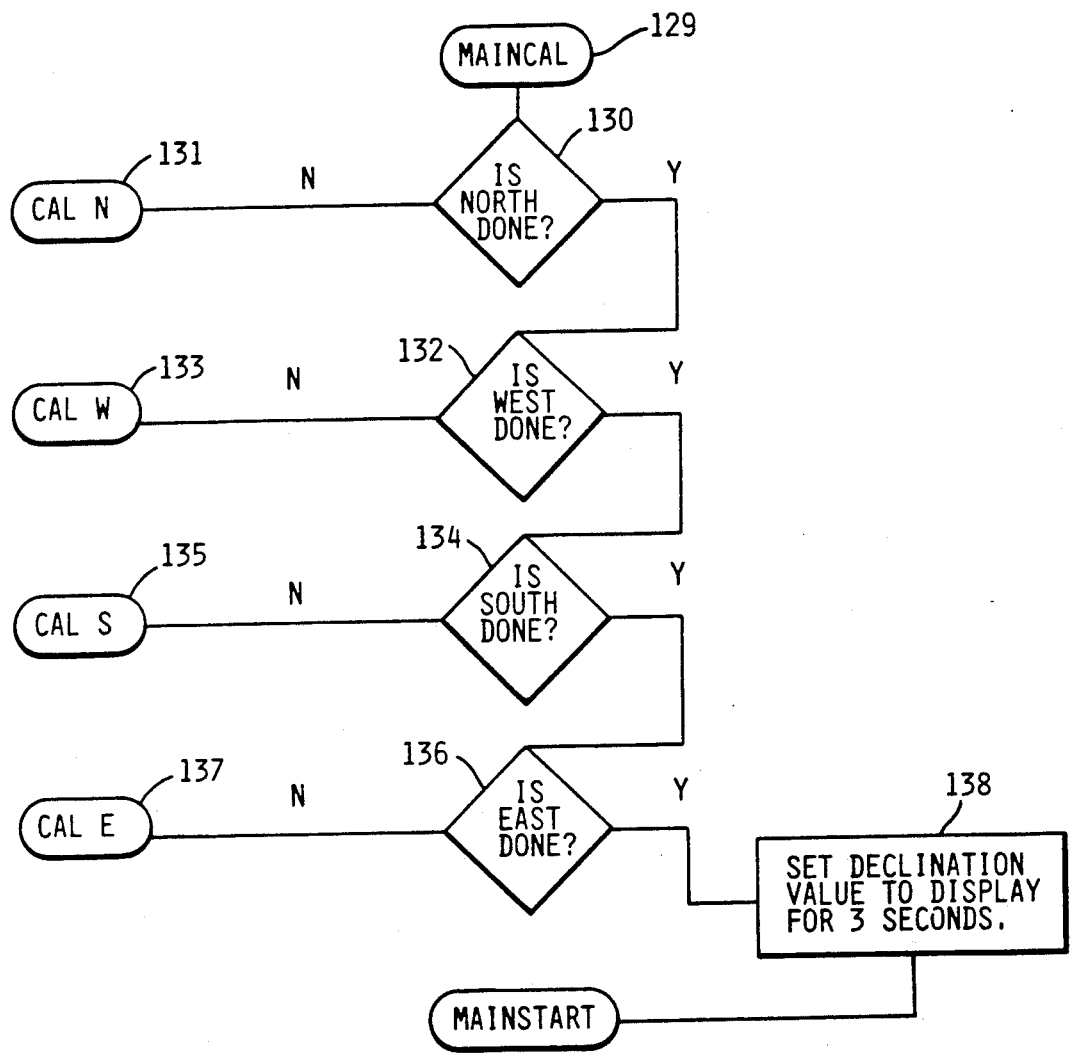
Figure 9:
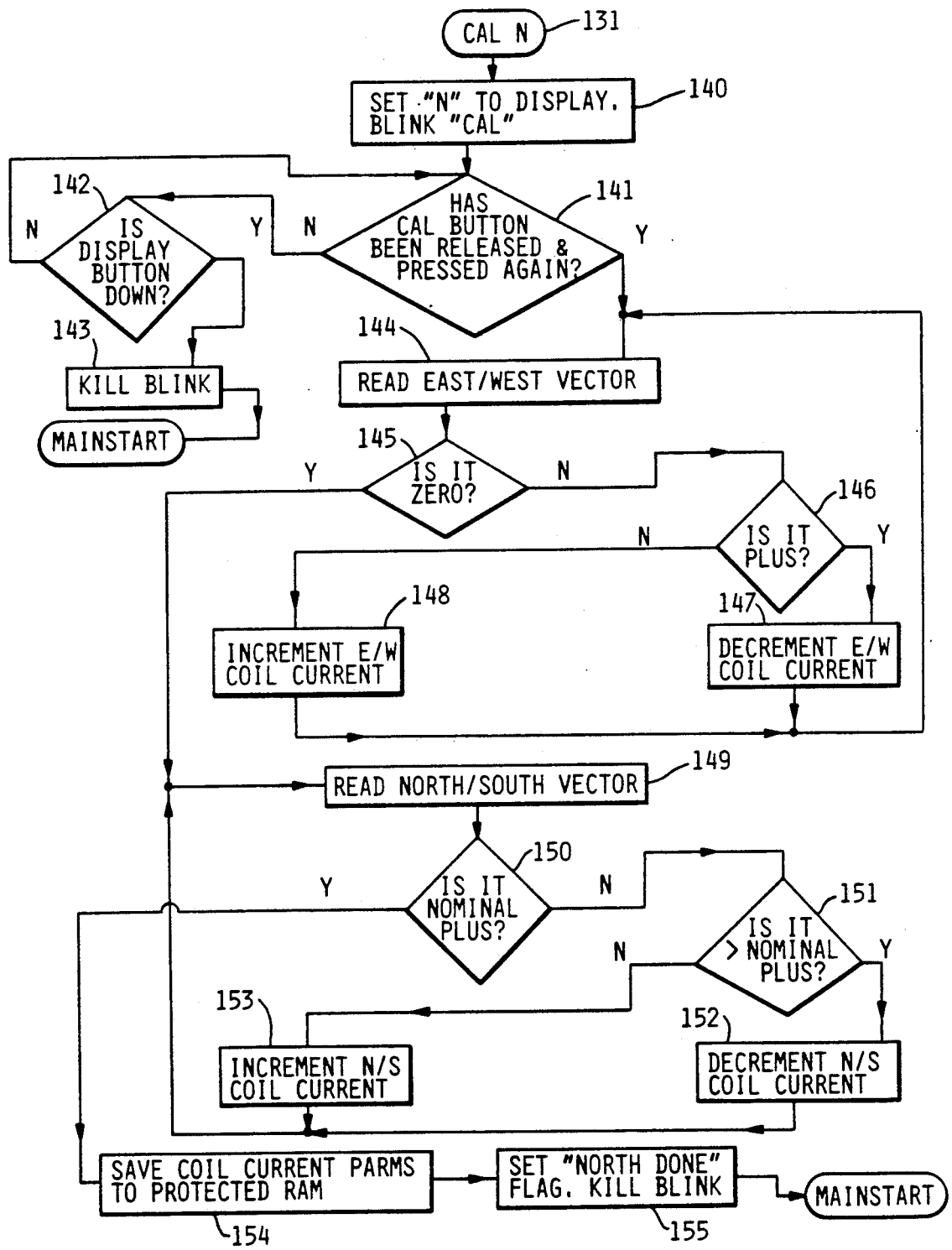

Button Logic 47 in FIG. 2 performs two functions. It passes through to the processor Port A, FIG. 3, (PA∅-3) the output status of the user button switches 48-51 which will be logical high if not pressed and low while pressed. It also generates an interrupt signal coupled to the INT1 input of the processor whenever any button is pressed. This causes the processor to immediately halt execution of the current program and jump to the service routine shown in FIG. 7. The button ports are read, at 115, to determine which button caused the interrupt. The first priority, at 116, is the display ON/OFF button 11. This always toggles (reverses) the "Display Off" flag 117 such that the display will be turned On or Off the next time this flag is tested by the main program loop. The program then exits the service routine 118 and resumes execution of the main program at the point of interruption. The second priority is the CAL/TEST button 20. If this is true, see 119, the program checks, at 120, if the display is currently On. If yes, the program jumps to MAINCAL as shown in FIG. 8 to determine which calibration step is next and then jumps to it. If all four steps have been done, the computed declination angle value is set to the display for 3 seconds followed by a return to the main program loop.

Referring back to FIG. 7, if the CAL button caused the interrupt and the display is off, the IN/OUT button 18 is tested next, at 121. If this button was pressed after CAL, a special routine is entered, at 122, which will sequentially display the current contents of the protected RAM in display area 16. Once entered, the next value will be displayed each time the CAL button is pressed. This feature is primarily intended as a diagnostic tool for qualified service personnel. This mode is exited by pressing the ON/OFF button causing display blanking and resumption of a wait state as shown at 123.

If the IN/OUT button was not down, the C/F 19 and ON/OFF 11 buttons are both tested, at 124, for closure. If true, then the predetermined sequence of button operations needed to restart the entire calibration procedure has been met and the entire protected RAM is cleared as shown at 125 followed by a jump to POWER UP which will then follow the cold start path. If not true, the next test is for the ON/OFF button only. If true, another special routine (SELF TEST) 127 is entered which forces the display to follow an endless, predetermined sequence of every possible direction indication. The primary purpose of this feature is for point-of-sale displays such that potential buyers can observe the system "in action" to better understand its purpose even though a sensor may not even be connected.

If none of the tests 121, 124 or 126 are true, the final test is for all buttons being released, as shown at 128. If true, the service routine is exited without action. If the CAL button is still down, these tests are repeated endlessly.

FIG. 8 illustrates the Calibration Sequence Control Routine which is always entered at MAINCAL 129 whenever the CAL/TEST button 20 is pressed with the display in an On state. MAINCAL controls the overall progression of the four-step calibration process which, in the preferred embodiment, is CAL NORTH, WEST, SOUTH and EAST. As each of these four calibration steps is completed, a distinctive bit flag is set in the protected RAM such that MAINCAL can readily test and verify which of the four steps have already been performed and which are yet to be done. The first test 130 determines if CAL N, that calibration procedure performed while the vehicle is aligned with true North, has already been done. If yes, then MAINCAL goes on to test the remaining three directions 132, 134 and 136 to determine if any calibration steps remain undone. If any is found, it will naturally be the next in sequence and program flow now jumps to the unique routine to perform it as CAL N 131, CAL W 133, CAL S 135 or CAL E 137. If MAINCAL finds that all four steps are already completed, then no further calibration is allowed. The declination value which was determined at the conclusion of CAL E is merely sent to the display for a three second period 138 and normal operation resumed via MAINSTART.

The logical processes followed by each of the calibration steps—CAL N, W, S AND E—are shown in FIGS 9, 10, 11 and 12 respectively. They all share the same beginning and this is described in reference to FIG. 9. At 140, the directional symbol corresponding to the calibration direction to be performed (in this case, "N" for North) is set to the display regardless of the actual vehicle direction. The CAL symbol 12 is set to blink on and off as a signal to the user that the system is waiting for a response. In the preferred embodiment, this blinking function is accomplished by conventional use of a programmable Timer internal to the microprocessor. The user must have pressed the CAL button once to have reached this point in the program and he has now been prompted by the display to align the vehicle in the true direction indicated. At 141, the process waits for the user to release the CAL button from the first pressing and to press it a second time as confirmation that the vehicle has been properly pre-aligned. If this has not yet occurred, then the Display ON/OFF button 11 is tested for closure at 142. If the user elects to press the Display button instead of pressing the CAL button a second time, it means that he is not ready to align the vehicle and was merely checking calibration status. In this event, the blinking CAL symbol is switched off at 143 and normal operation is resumed via MAINSTART. The calibration status remains unchanged. On the other hand, if the CAL button is pressed a second time, the process assumes that the vehicle is properly pre-aligned and proceeds with the detailed calibration activity unique to the given direction.

For CAL North (FIG. 9), this begins at 144 where an initial reading is taken of the East/West vector. If the magnetic sensor was perfectly aligned to magnetic North or South and free of magnetic interference, the East/West vector would be in a null state resulting in a binary reading of $00. The first objective of CAL N is to adjust the dc current in the E/W coil to force this result. In the preferred embodiment, circuit connections between the D/A converter 39 and the field coils 32,33 are predetermined such that the act of "incrementing" the E/W coil current will result in a more positive (westerly) E/W output and vice versa. The current reading is tested at 145 to see if it is already at the desired null condition. Assuming it is not, a second test 146 determines the error polarity and either decrements 147 or increments 148 the coil current to push the E/W output closer to zero. The new E/W output is read again at 144 and the process continues until a unique value and direction of E/W coil current is found which results in an E/W output closest to zero. Next the North/South Vector is examined at 149. According to the polarity conventions of the preferred embodiment, a North vector is positive in the binary range $00 to $7F and a South vector is negative in the binary range $00 to −$7F. Furthermore, circuit parameters are predetermined such that a nominal binary reading of +$30 will result when the magnetic sensor is facing magnetic North in free space. The next objective of CAL N is to find a unique value and direction of N/S coil current to produce this nominal plus reading and this is carried out in 149 thru 153 in FIG. 9. The actual coil currents are set according to the binary content of a 24 bit serial data stream sent by the processor 52 to the D/A converter 39 via the Clock 55 and Data 56 signal paths. The four 6-bit values used to construct this 24 bit data stream are always stored in protected RAM and can be recalled later to reestablish the most recent coil current values and directions. These four values as modified by CAL N are saved at 154. Finally, a bit flag is set in the protected RAM indicating that CAL N has been completed, the blinking CAL symbol is switched off 155 and normal operation resumes. At this point, the bulk of the E/W and N/S components of the interfering vehicle chassis vector have been cancelled by the dc coil currents but two residual errors remain. First, the vehicle was pointing true North but CAL N treated it as magnetic North. Second, the N/S output was forced to a nominal value of $30 but this can vary due to circuit tolerances as well as natural variances in the earth's field strength with location and the coupling coefficient between the sensor and the chassis. CAL W addresses this second error.

Figure 10:
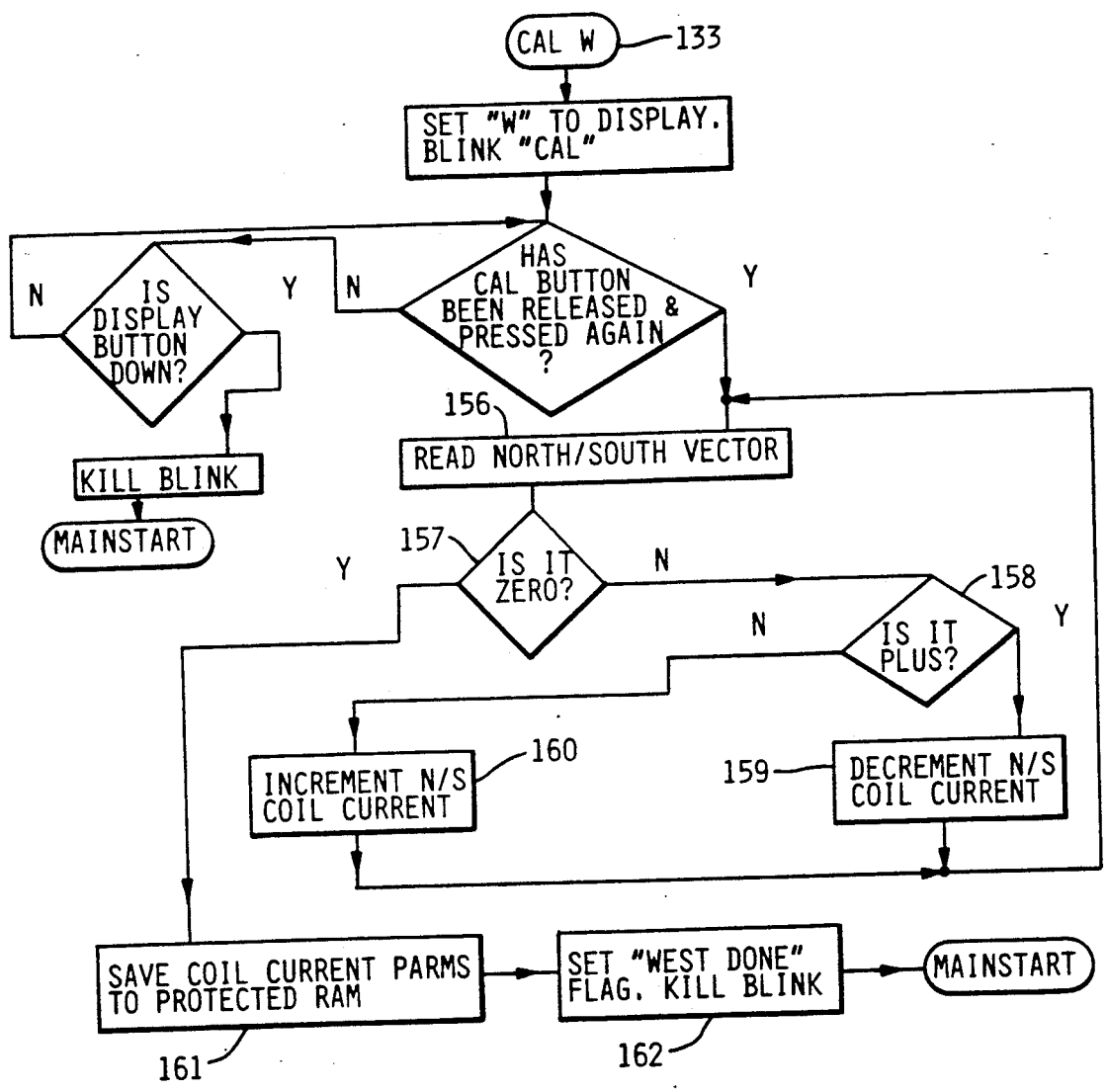
Figure 11:
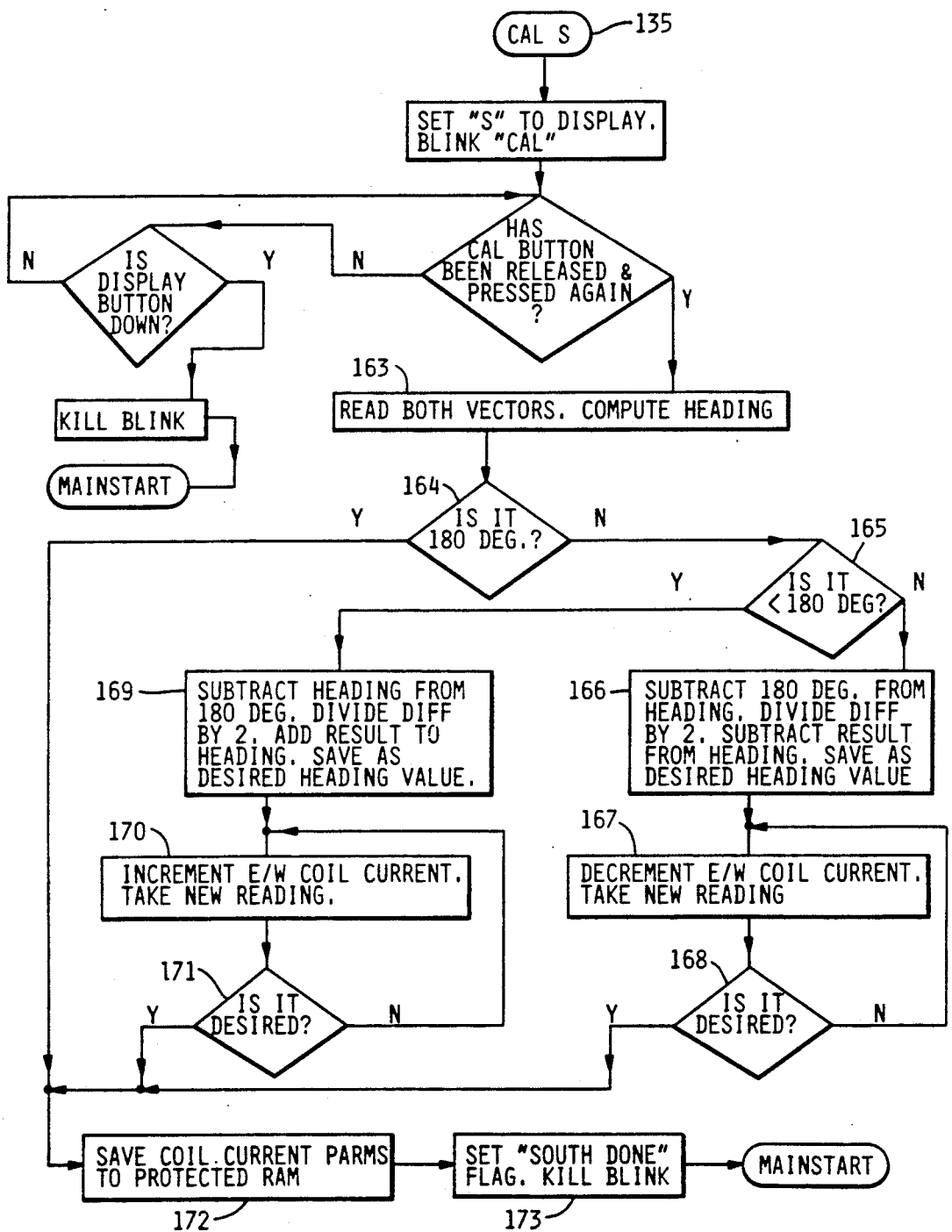

The CAL W process in FIG. 10 follows the same flow as CAL N except that it only deals with the N/S output and coil current. The objective is to refine the current value while facing West when the N/S output should be in a null state regardless of field strength. This is accomplished by 156 thru 160 and the revised binary values are saved to RAM at 161. A different bit flag is set at 162 confirming that CAL W is also done and normal operation is resumed with improved accuracy.

CAL N and W were carried out in the assumption true North and magnetic North were the same and in some geographic locations this is true. In that case, no further calibration is necessary. The final two steps, CAL S and E deal with the more common condition where they are not the same. While CAL N and W operated on individual N/S or E/W vectors, CAL S and E start by first computing an angular heading based on both vectors and then adjusting coil current to produce an altered heading in the range of 0–360 deg. The unique portion of CAL S shown in FIG. 11 starts at 163 where a first heading is computed. It should be 180 degrees if magnetic deviation is truly zero as tested at 164. If true, CAL S is exited without action. If not, a second test 165 determines if it is greater or less than 180 degrees. Depending on the result, either path 66 thru 168 or 169 thru 171 is followed but the common objective is to adjust E/W coil current such that the original difference between the first heading and 180 degrees is cut in half. The reason for this strategy rather than forcing the heading to be 180 degrees is not obvious but will be clarified by the mathematical analysis following. Upon completion, the revised binary current values are saved 172 and the CAL S Done flag is set 173.

Figure 12:
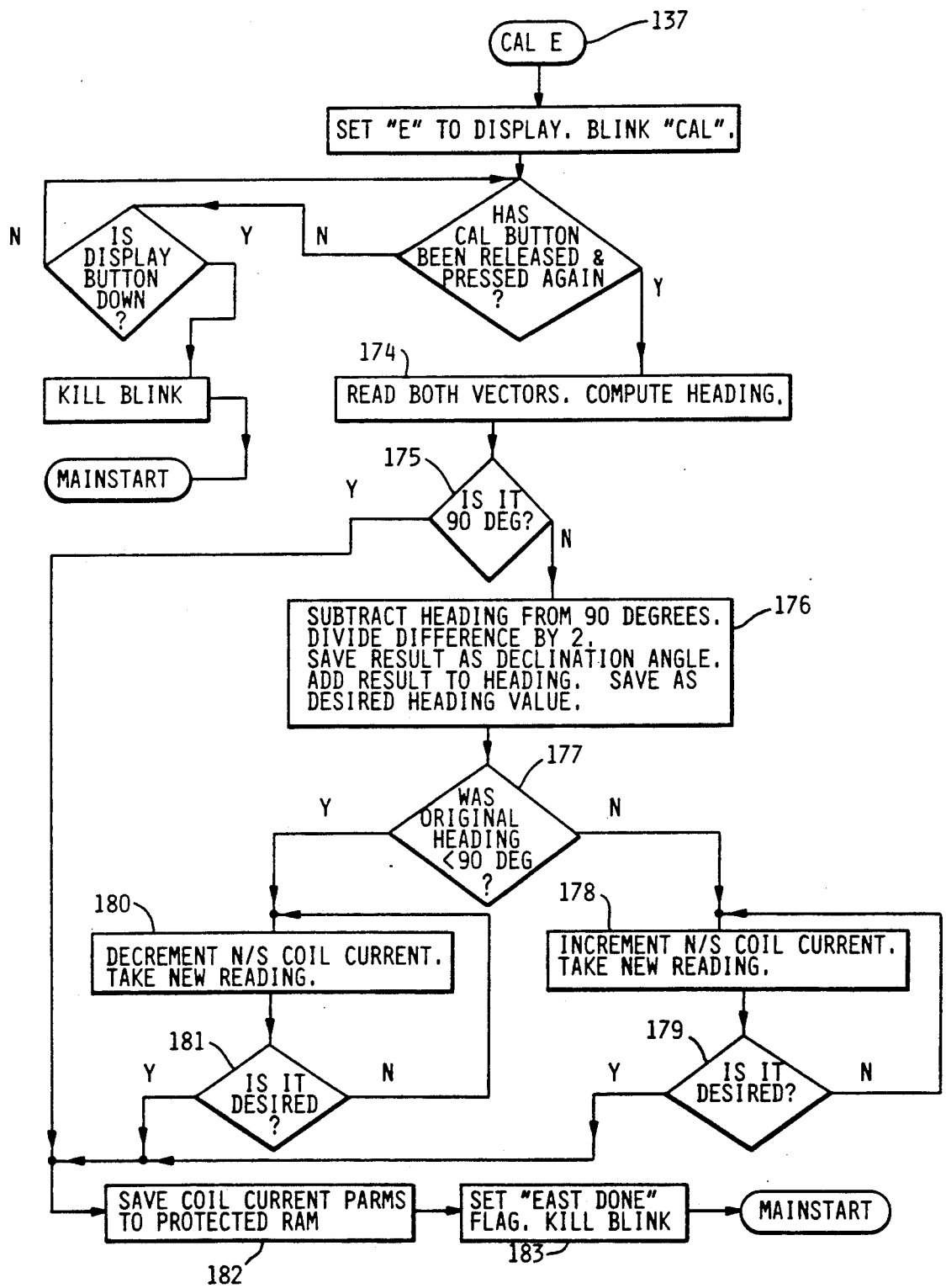

The CAL E process shown in FIG. 12 begins at 174 by computing an initial heading which is then compared to the ideal 90 degrees. If yes, then the declination angle must be zero and CAL E is exited without further action. If different, then the amount of the difference is very significant because, as will be shown, the amount of this initial difference, whether positive or negative, will be just double the actual declination angle provided that the first three steps were accurately performed. At 176, the initial heading is subtracted from 90 degrees and the result is divided by 2. For example, if the initial heading was 110 degrees (South of East), then (90−110)/2 = −10. Two things are done with this value. First it is combined the initial heading to form a new desired heading the same as in CAL S only this time the N/S coil current will be adjusted in order to reach it. In this example, 110−10=100 degrees=new desired heading. Second, this value is saved as the actual declination angle which will be added to all future computed headings before conversion to the one-of-eight direction display 15. It is also the value that will be shown in display area 16 for 3 seconds upon all future pressing of the CAL/TEST button 20. The final step is to actually adjust the N/s coil current to force the new desired heading. The error polarity is tested 177 and either path 178-179 or 180-181 is followed to increment or decrement N/S current to assure that adjusted headings will be moving towards the desired and not away. In the preferred embodiment, circuit conventions as such that incrementing N/S coil current will cause the N/S output to shift towards the North. In the example, the initial heading was 110 degrees which errs to the South so the N/S coil current must be incremented to shift from 110 to 100 degrees, a more northerly result. The final binary current values are saved at 182 and the East Done flag is set 183 to confirm full calibration.

In summary, CAL N and W cancel the majority of the fixed interfering magnetic field originating in the vehicle chassis at the sensor location but assume that true direction and magnetic direction are the same. In general, they are not the same and this results in over or under compensation of both axes. CAL S corrects the E/W axis and CAL E corrects the N/S axis resulting in an accurate magnetic direction-finding system in spite of fixed interference from the magnetic vehicle chassis. An error term (the declination angle) is also defined and added to all future magnetic heading results, thereby converting to a true direction-finding system.

ANALYSIS OF THE CALIBRATION PROCESS (FIGS. 13 AND 13 A)

Definitions:

X-Axis: The horizontal axis parallel to the vehicle direction of travel

Y-Axis: The horizontal axis perpendicular to the direction of travel.

$X_E$, $Y_E$: The X and Y components of the earth's magnetic field passing through the sensor at any time. Varies with direction.

$X_V$, $Y_V$: The X and Y components of a fixed magnetic field passing through the sensor and originating in the vehicle chassis. Constant for any direction of travel.

$X_C$, $Y_C$: The X and Y components of a magnetic field passing through the sensor and originating in the sensor itself by passing a direct current through the N/S and E/W output coils respectively. Constant for any direction of travel but variable during the Calibration process.

$X_T$, $Y_T$: The X and Y components of the net total magnetic field passing through the sensor at any time such that $$X_T = X_E + X_V + X_C; \quad Y_T = Y_E + Y_V + Y_C$$

and the resultant Vector $V_T = X_T + j Y_T$ $|V_T|$ The magnitude of the resultant vector where $$|V_T| = [(X_T)^2 + (Y_T)^2]^{\frac{1}{2}}$$

$H_T$: The angular direction of $V_T$ relative to the vehicle direction of travel expressed as $$H_T = \tan^{-1}(Y_T/X_T)$$

which is also the heading computed for display purposes. Heading conventions commonly used in Air/Sea navigation are followed such that true North=$0°$, East=$90°$, South=$180°$ and West=$270°$.

The total magnetic flux vector to which the compass system will respond is $$V_T = X_E + X_V + X_V + X_C + j(Y_E + Y_V + Y_C) \quad (1)$$

The first objective of the calibration process is to set the values of $X_C$ and $Y_C$ to $-X_V$ and $-Y_V$, respectively such that only the variable earth components remain in eq (1) and the sensed heading $$H_T = \tan^{-1}(Y_E/X_E) \quad (2)$$

will be the actual magnetic heading. The second objective is to determine the value of the declination angle (d) such that it can be added or subtracted from all future magnetic headings thereby converting to a true heading.

Let $X_{EN}$ and $Y_{EN}$ equal the particular values of the earth's components when facing true North. If the magnitude of the total earth field is set to a relative value of unity, then $$X_{EN} = \cos d; \quad Y_{EN} = \sin d$$

Figure 13:
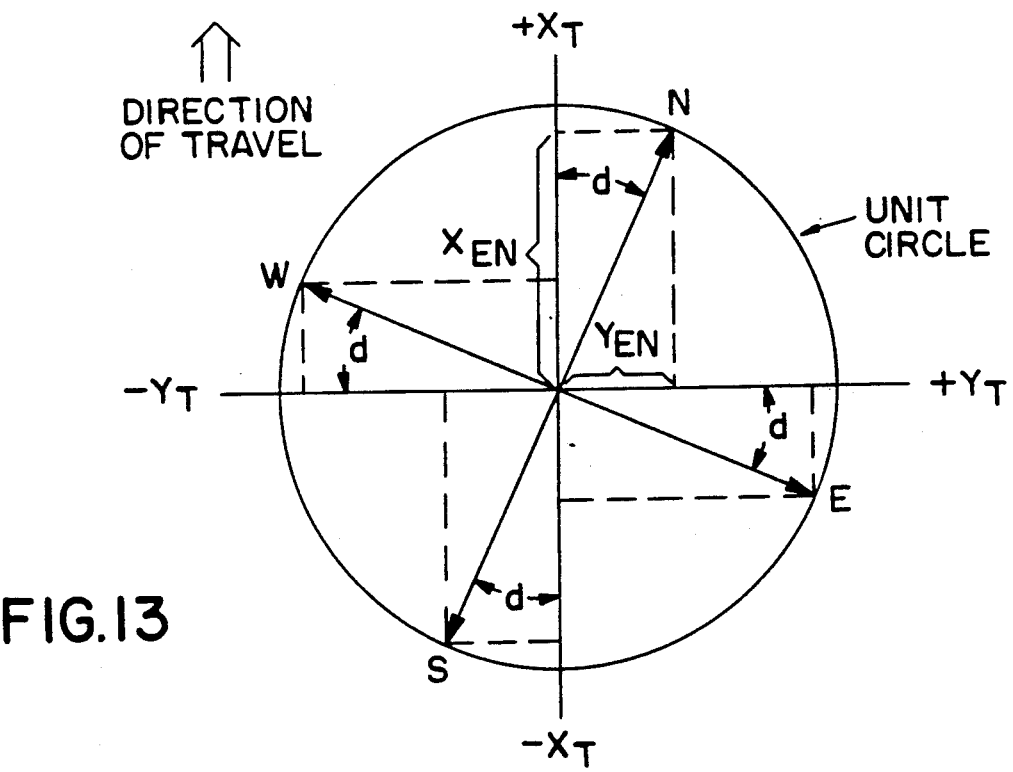
FIG. 13 is a vector diagram helping to clarify the mathematical analysis of the calibration procedure.

By inspection of FIG. 13, it is seen that the earth's X and Y components when facing any major heading can be expressed in terms of $X_{EN}$ and $Y_{EN}$. This is summarized in Table 1.

TABLE 1

| Direction | $X_E$ | $Y_E$ |
|---|---|---|
| North | $X_{EN}$ | $Y_{EN}$ |
| West | $Y_{EN}$ | $-X_{EN}$ |
| South | $-X_{EN}$ | $-Y_{EN}$ |
| East | $-Y_{EN}$ | $X_{EN}$ |

The calibration process begins by facing the vehicle to true North, thus $$V_{TN} = X_{EN} + X_V + X_C + j(Y_{EN} + Y_V + Y_C) \quad (3)$$

but $X_C$ and $Y_C$ are currently zero since coil current starts in a null condition. After CAL N, $Y_C$ and $X_C$ have been adjusted to force $$Y_{EN} + Y_V + Y_C\emptyset; \quad X_{EN} + X_V + X_C = \$30$$

where $30 is a hexidecimal value corresponding to the nominal North vector to be expected if the sensor was in free space. To accomplish this, $$Y_C = -(Y_{EN} + Y_V); \quad X_C = 30 - (X_{en} + X_V)$$

such that after CAL N we have $$\begin{aligned} V_{TN} &= X_{EN} + X_V + [30 - (X_{EN} + X_V)] + \\ &\quad j[Y_{EN} + Y_V - (Y_{EN} + X_V)] \\ &= 30 + j0 \end{aligned} \quad (4)$$

The operator is next prompted to face the vehicle to true West. Using Table 1, the initial conditions are $$V_{TW} = Y_{EN} + X_V + [30 - (X_{EN} + X_V)] + j[-X_{EN} + Y_V - (Y_{EN} + Y_V)] \quad (5)$$

remembering that the vehicle and coil components do not change with direction. The CAL W process further adjusts the value of $X_C$ to force the total X component to zero. The new value of $X_C$ becomes $$X_C = -(Y_{EN} + X_V)$$

The value of $Y_C$ is unchanged from CAL N and remains $$Y_C = -(Y_{EN} + Y_V)$$

The result after CAL W is $$\begin{aligned} V_{TW} &= Y_{EN} + X_V - (Y_{EN} + X_V) + \\ &\quad j[-X_{EN} + Y_V - (Y_{EN} + Y_V)] \\ &= 0 + j - (X_{EN} + Y_{EN}) \end{aligned} \quad (6)$$

The vehicle is next pointed to true South and again, by using Table 1, the initial conditions are $$\begin{aligned} V_{TS} &= -X_{EN} + X_V - (Y_{EN} + X_V) + \\ &\quad j[-Y_{EN} + Y_V - (Y_{EN} + Y_V)] \\ &= -(X_{EN} + Y_{EN}) + j - 2Y_{EN} \end{aligned} \quad (7)$$

and the initial measured heading will be $$H_{TS}=\tan^{-1}(2Y_{EN}/X_{EN}+Y_{EN})+180° \quad (8)$$

The structure of eq (6) and (7) reveals two important conclusions.

1. If the declination angle had been zero degrees initially, then $Y_{EN}=\sin 0°$ resulting in $$V_{TS}=-X_{EN}+j0; H_{TS}=180°$$

and furthermore, $X_C$ reduces to $-X_V$ and $Y_C$ to $-Y_V$. Perfect calibration has been achieved in only two steps, CAL N and CAL W.

2. To the extent that the declination angle differs from zero, the current calibration status is over-or under-compensated by amounts that can be expressed entirely in terms of $Y_{EN}$ regardless of the actual values of the vehicle chassis components $X_V$ and $Y_V$.

Before CAL S, $X_C=-(Y_{EN}+X_V); Y_C=-(Y_{EN}+Y_V)$
Evidently, $X_C$ and $Y_C$ can be set to their desired final values by deleting the $Y_{EN}$ term from their current status but we lack a straightforward computer process to accomplish this because the terms $Y_{EN}$, $X_V$ and $Y_V$ can take any combination of + or − values and, in any case, this method would not lead to a declination angle value. The conclusion is that CAL S and CAL E must adjust the values of $X_C$ and $Y_C$ but the process must be based on computed heading angles rather than on absolute values of the X and Y vectors as in CAL N and W and furthermore, that the objective is not to force a heading of 180° and 90° but to effectively remove the $Y_{EN}$ term from $X_C$ and $Y_C$.

After CAL W, eq (8) shows that the heading when facing true South will differ from 180° by an amount $$\tan^{-1}(Y_{EN}/X_{EN}+Y_{EN})=\tan^{-1}(Y_T/X_T)$$

Using Table 1, the expected heading when facing true East is found from $$V_{TE}=-2Y_{EN}+j(X_{EN}-Y_{EN}) \quad (9)$$

$$H_{TE}=\tan^{-1}(X_{EN}-Y_{EN}/2Y_{EN})=\tan^{-1}(Y_T/X_T) \quad (10)$$

Basic Trigonometry teaches that for relatively small angles (<45°)

tan (a/2) is approximately (tan a)/2 The structure of eq (8) suggests that if, during CAL S, the value of $Y_C$ was adjusted to reduce the initial heading error by 50%, then eq (8) would approximately reduce to $$H_{TS}=\tan^{-1}[Y_{EN}/(X_{EN}+Y_{EN})]+180°$$

and we have effectively removed one $Y_{EN}$ term from the value of $Y_C$ as desired.

Now when the vehicle is aligned to true East, eq (9) and (10) reduce to $$V_{TI}=-2Y_{EN}+jX_{EN} \quad (9a)$$

$$H_{TE}=\tan^{-1}(X_{EN}/-2Y_{EN})=\tan^{-1}(Y_T/X_T) \quad (10a)$$

wherein the initial error is $90-H_{TE}$.
Following the same logic, if CAL E adjusts the value of $X_C$ to reduce this initial error by 50%, we have effectively removed one $Y_{EN}$ term from $X_C$ and now $$X_C=-X_V; Y_C=-Y_V$$

meaning that the chassis components have been finally canceled and eq (2) has been satisfied such that all future computed headings will indeed represent the actual magnetic heading. The remaining 50% error between $H_{TE}$ and 90° is obviously equal to the declination angle since the addition of this angle to $H_{TE}$ will always result in 90°. The sensor system has already been compensated to yield accurate magnetic headings for any direction so the addition of this angle which can have a + or − value to all future headings will result in a true heading.

Figure 13A:
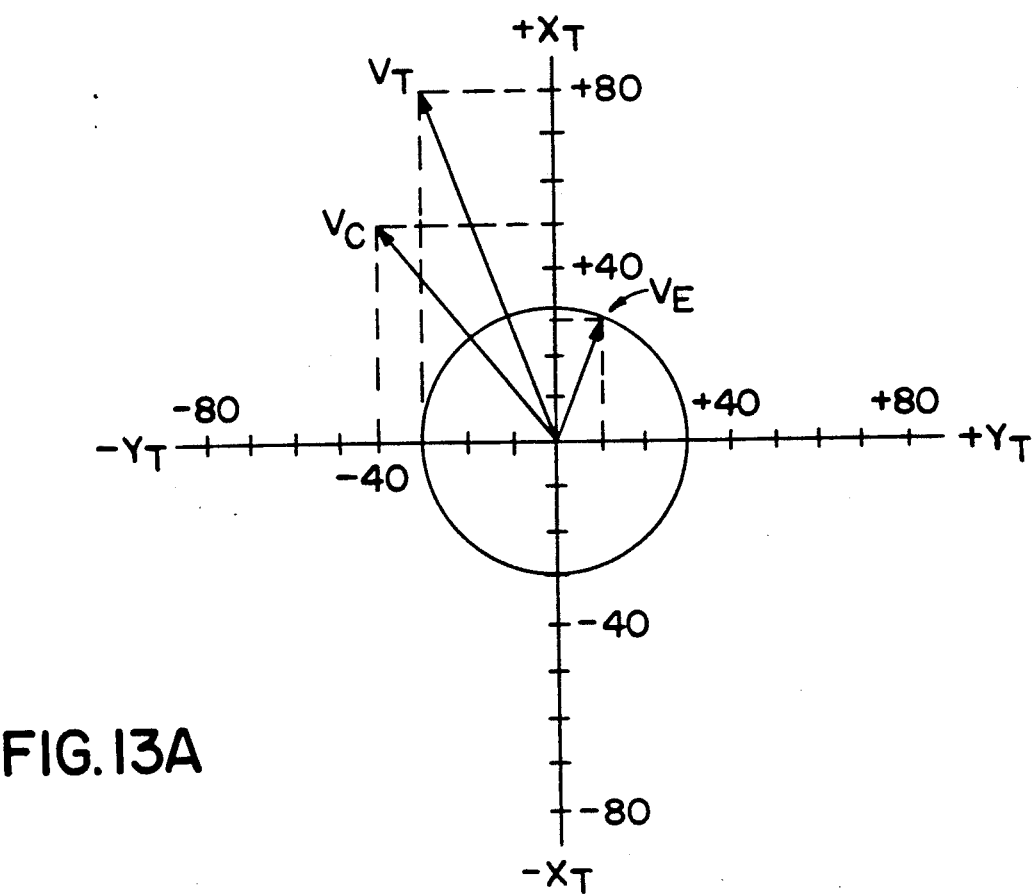
FIG. 13a is a vector diagram depicting how a fixed magnetic field originating in the vehicle chassis combines with the earth's magnetic field to produce a resultant magnetic vector of possibly excessive strength.

FIG. 13A is a vector diagram depicting how the earth's magnetic vector $V_E$ is perturbed by a fixed magnetic vector originating in the vehicle chassis $V_C$ which may be considerably stronger than the earth vector and resulting in a resultant vector $V_T$. The X and Y axes are further calibrated in a scale representing the actual binary values that will be presented to the microprocessor, one value for the N/S vector and one value for the E/W vector, after the A/D conversion process.

Accordingly in FIG. 13A, the earth vector $V_E$ is seen to have an X component of slightly less than +$30 and a Y component of +$10 ($Y_{EN}$). The earth vector is shown on a unit circle which intersects both axes at +/−$30 which relates to the use of the value $30 as a nominal North vector during the CAL N process.

The chassis vector $V_C$ is shown as having an X component of +$50 which, in this case, reinforces the earth's X component such that the resultant X component is their sum which approaches +$80. The Y component of $V_C$ is shown as −$40 which opposes $Y_{EN}$ and results in a net Y component of −$30.

WAVEFORMS

Figure 13B:
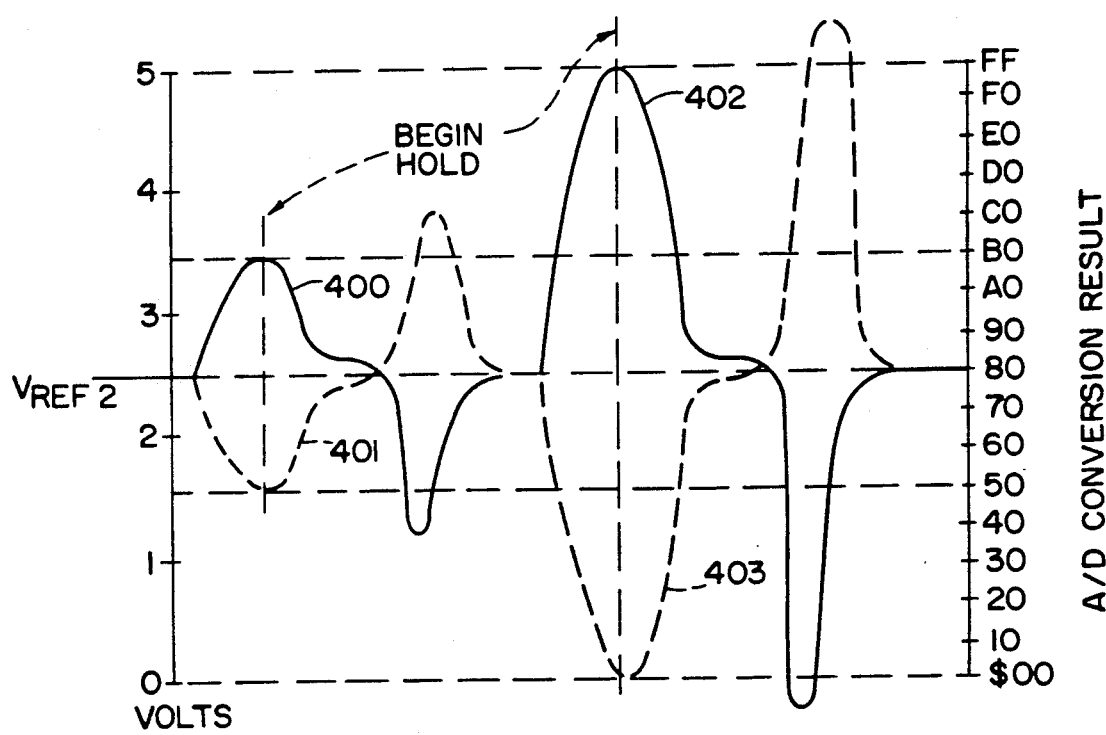
FIG. 13b is a graph showing the sensor output wave forms under both normal and perturbed conditions.

FIG. 13B depicts the sensor output waveforms from the N/S coil that would result from the vector conditions of FIG. 13A, with and without the effects of $V_C$. Also shown is the elationship between the peak value of the analog waveform expressed in volts and further being the voltage level captured by the Sample and Hold circuit to the actual binary value resulting from the A/D conversion.

The baseline for the waveform is shown as $V_{REF2}$ in volts as indicated in FIG. 3, 92, and as the converted binary value 80. In the preferred embodiments the A/D converter has been configured to convert an input of 0 volts or less to $00 and an input of +5 volts or more to $FF. Any input between these voltage levels is converted to intermediate values in linear fashion. Accordingly, peak waveform levels greater than $V_{REF2}$ versa. The microprocessor converts the binary value produced by the A/D converter to an X or Y component which can be + or − by subtracting binary $80 from the binary value. Hence, waveform 400 in FIG. 13B converts to $BO and becomes a vector of +$30 after subtraction of baseline $80. Waveform 401 would result if the sensor was rotated 180° and would convert to $50 corresponding to a vector of −$30.

Waveform 400 corresponds to the N/S output that would result from the earth vector only as shown in FIG. 13A. The addition of $V_C$ drives this waveform to a peak value of 5 volts (binary $FF) as shown as waveform 402 in FIG. 13B. It converts to a vector of +$80 as shown in FIG. 13A. Alternatively, the chassis component might have resulted in a waveform having a strong negative peak, 403, which converts to −$80. The microprocessor can readily test the value of any vector to determine if it is at or near the maximum saturation levels of +/−$7F and set a warning signal to the installer by lighting the TEST symbol 13 in FIG. 1. The installer may respond by pressing pushbutton 62 to actuate switch 58, in FIGS. 2 and 15, to reduce the gain of voltage amplifiers 34 and 35 by 6 db whereupon waveform 402 may revert to a level similar to waveform 400. Now the vector value is well below +$80 and the TEST symbol is allowed to turn off.

If the perturbed waveform 402 was initially more than +5 volts, it might remain above +5 volts even with reduced gain. This corresponds to a chassis component beyond the range of the compensation system. The TEST symbol remains ON and the installer proceeds to seek a better sensor location.

ALTERNATIVE PACKAGING

As now disclosed, the preferred embodiment of the present invention provides a digital compass for the automotive aftermarket in which the main housing is configured in the standard Half DIN E package for indash installation using available kits. However, this embodiment may not be suitable for a number of potential users either because their vehicle type may not accept such kits or because they already have another Half DIN E device installed. In another embodiment, the display 45, display driver 44 and control switches 48–51 are physically separated from the remaining main unit but interconnected by a cable. They are repackaged in a thin and light-weight plastic housing 301, FIG. 16, in which the control buttons are repositioned directly below the display for a more convenient form factor and which can readily be fixed to any convenient location on the instrument panel using double-sided adhesive tape. The remainder 302 of the main unit can be mounted in any convenient location under the instrument panel out of sight. The magnetic sensor 61 is installed as before.

It will become apparent to those skilled in the art that various modifications to the embodiments described herein can be made without departing from the spirit and scope of the invention as defined by the appended claims.

What is claimed is:

1. An electronic compass system for use in the automotive aftermarket in any of a wide variety of motor vehicle models, said system comprising a static magnetic sensor, digital display means, a plurality of manual control means, and circuit means having memory means associated therewith, said circuit means interconnecting said static sensor and said display and control means, and said circuit means including
    means which, in a four-step calibration procedure, are responsive to the actuation, upon prealignment of a vehicle, in one of said steps, in the corresponding major true geographic heading, of one of said control means to initiate the corresponding step of said calibration procedure, each step following the first step refining the calibration, and
    means responsive to the successful completion of the final step, to cause said circuit means to transmit to said display means a signal indicative of the angle of apparent deviation between geographic heading and magnetic heading in the given geographic location, and store said apparent deviation in said memory means
so that, during subsequent operation of the system in indicating the direction of travel, any direction indicated by said display means is automatically corrected by said angle.

2. An electronic compass system as claimed in claim 1,
    wherein said circuit means includes means responsive to the actuation of the manual control means in a specific multiple step combination to clear said memory means and repeat the entire calibration procedure, whereby repetition of the calibration procedure is made possible and yet accidental clearing of said memory means is obviated.

3. An electronic compass system as claimed in claim 1, wherein said circuit means also includes means responsive to a calibration-repeat signal transmitted by a user in case he determines said apparent deviation to be in excessive disagreement with the actual deviation, known to him, in the given geographic location, to initiate repetition of the calibration procedure.

4. An electronic compass system as claimed in claim 3,
    wherein said circuit means is arranged to normally accept no further calibration inputs after said four-step calibration procedure has been completed, and
    wherein the means responsive to a calibration repeat signal are responsive to the actuation of the manual control means in a specific multiple step combination to initiate said repetition of the calibration procedure,
    whereby repetition of the calibration procedure is made possible and yet accidental clearing of said memory means is obviated.

5. A digital compass system for motor vehicles, comprising a static magnetic sensor, digital display means, a plurality of manual control means and circuit means having memory means associated therewith, said circuit means interconnecting said static magnetic sensor and said display and control means,
    wherein said static magnetic sensor is a flux-gate sensor having an excitation winding and two mutually orthogonal output windings,
    wherein said circuit means includes
        a microprocessor programmed for use in both a calibration mode and a direction-of-travel indicating mode,
        means controlled by said microprocessor in said calibration mode for applying timed excitation pulses to said excitation winding, and
        means controlled by said microprocessor for deriving from pulses supplied by said output windings in response to said excitation pulses, analog information corresponding to the amplitude and polarity of said output pulses and supplying said information to said microprocessor, and
    wherein said microprocessor comprises an analog-to-digital converter and produces, with the aid of said converter, from said analog information serial streams of binary data, and
    wherein said circuit means further includes a digital-to-analog converter connected to said microprocessor for deriving from said binary data streams, incrementally, direct currents which are supplied to the winding of said flux-gate sensor to stepwise adjust the flux generated by said winding until the fixed magnetic flux of the vehicle chassis has been compensated for.

6. An electronic compass system for use in the automotive aftermarket in any of a wide variety of motor vehicle models, said system comprising a static magnetic sensor, digital display means, a plurality of manual control means, and circuit means having memory means associated therewith, said circuit mans interconnecting said static sensor and said display and control means, and said circuit means including means which, in a calibration procedure consisting of a plurality of steps, are responsive, upon prealignment of the vehicle, in one of said steps, in a predetermined direction, of one of said control means to initiate a corresponding step of said calibration procedure, means responsive to the completion of the final step, to cause said circuit means to transmit to said display means a signal indicative of the angle of apparent deviation between geographic heading and magnetic heading in the given geographic location, for display of the value of said angle in said display means, and store the apparent deviation angle in said memory means so that, during subsequent operation of the system in indicating the direction of travel, any direction indicated by said display means is automatically corrected by said angle, and means responsive to a calibration-repeat signal transmitted by a user in case he determines from the display of the angle of apparent deviation in said display means, said apparent deviation to be in excessive disagreement with the actual deviation, known to him, in the given geographic location, to initiate repetition of the calibration procedure.

7. An electronic compass system for use in the automotive aftermarket in any of a wide variety of motor vehicle models, said system comprising a static magnetic sensor, digital display means, a plurality of manual control means, and circuit means having memory means associated therewith, said circuit means interconnecting said static sensor and said display and control means, and said circuit means including means which, in a four-step calibration procedure, are responsive to the actuation, upon prealignment of a vehicle, in one of said steps, in the corresponding major true geographic heading, of one of said control means to initiate the corresponding step of said calibration procedure, each step following the first step refining the calibration, and means responsive to the successful completion of the final step, to cause said circuit means to transmit to said display means a signal indicative of the angle of apparent deviation between geographic heading and magnetic heading in the given geographic location, and store said apparent deviation in said memory means so that, during subsequent operation of the system in indicating the direction of travel, any direction indicated by said display means is automatically corrected by said angle, and said control means including a manual control device for interrogating said circuit means with respect to the status of said calibration, and the circuit means including means responsive to the actuation of said device to send to said display means signals indicative of which of the four major true geographic headings should be used next for prealignment of the vehicle.

8. An electronic compass system for use in the automotive aftermarket in any of a wide variety of motor vehicle models, said system comprising a static magnetic sensor, digital display means, a plurality of manual control means, and circuit means having memory means associated therewith, said circuit means interconnecting said static sensor and said display and control means, and said circuit means including mean which, in a four-step calibration procedure, are responsive to the actuation, upon prealignment of a vehicle, in one of said steps, in the corresponding major true geographic heading, of one of said control means to initiate the corresponding step of said calibration procedure, each step following the first step refining the calibration, and means responsive to the successful completion of the final step, to cause said circuit means to transmit to said display means a signal indicative of the angle of apparent deviation between geographic heading and magnetic heading in the given geographic location, and store said apparent deviation in said memory means so that, during subsequent operation of the system in indicating the direction of travel, any direction indicated by said display means is automatically corrected by said angle, and said circuit means including means which upon receipt of an over-load test command signal, are responsive to the fixed magnetic components of the vehicle chassis exceeding the calibration capabilities of said system, to transmit an over-load signal to said digital display means, and said display means including an over-load indicator activated in response to said over-load signal, whereby the installer of the system, in searching for a desirable location for the sensor within the vehicle, is advised of the non-suitability of the attempted location.

9. An electronic compass system as claimed in claim 8, wherein a separate housing is provided for said sensor, and wherein a manual switch for transmitting said over-load test commaned signal is provided in said housing.

10. An electronic compass system for use in the automotive aftermarket in any of a wide variety of motor vehicle models, said system comprising a static magnetic sensor, digital display means, a plurality of manual control means, and circuit means having memory means associated therewith, said circuit means interconnecting said static sensor and said display and control means, and said circuit means including means which, in a four-step calibration procedure, are responsive to the actuation, upon prealignment of a vehicle, in one of said steps, in the corresponding major true geographic heading, of one of said control means to initiate the corresponding step of said calibration procedure, each step following the first step refining the calibration, and means responsive to the successful completion of the final step, to cause said circuit means to transmit to said display means a signal indicative of the angle of apparent deviation between geographic heading and magnetic heading in the given geographic location, and store said apparent deviation in said memory means so that, during subsequent operation of the system in indicating the direction of travel, any direction indicated by said display means is automatically corrected by said angle, and said circuit means also including means responsive to actuation of predetermined manual control means to cause said display means, irrespective of whether or not a sensor is connected up, to sequentially display each of eight geographic headings, thereby to demonstrate to an observer the functional capability of said display means.

11. An electronic compass system for use in the automotive aftermarket in any of a wide variety of motor vehicle models, said system comprising a static magnetic sensor, digital display means, a plurality of manual control means, and circuit means having memory means associated therewith, said circuit means interconnecting said static sensor and said display and control means, and said circuit means including means which, in a four-step calibration procedure, are responsive to the actuation, upon prealignment of a vehicle, in one of said steps, in the corresponding major true geographic heading, of one of said control means to initiate the corresponding step of said calibration procedure, each step following the first step refining the calibration, and means responsive to the successful completion of the final step, to cause said circuit means to transmit to said display means a signal indicative of the angle of apparent deviation between geographic heading and magnetic heading in the given geographic location, and store said apparent deviation in said memory means so that, during subsequent operation of the system in indicating the direction of travel, any direction indicated by said display means is automatically corrected by said angle, and said static magnetic sensor being a flux-gate sensor having an excitation winding and two mutually orthogonal output windings, and said circuit means also including a microprocessor programmed for use in both a calibration mode and a direction-of-travel indicating mode, means controlled by said microprocessor in said calibration mode for applying timed excitation pulses to said excitation winding, and means controlled by said microprocessor for deriving from pulses supplied by said output windings in response to said excitation pulses, analog information corresponding to the amplitude and polarity of the output pulses and supplying said information to said microprocessor.

12. An electronic compass system as claimed in claim 11, wherein said microprocessor comprises an analog-to-digital converter and produces, with the aid of said converter, from said analog information serial streams of binary data, and wherein said circuit means further includes a digital-to-analog converter connected to said microprocessor for deriving from said binary data streams, incrementally, direct currents which are supplied to the output windings of said flux-gate sensor to stepwise adjust the flux generated by said winding until the fixed magnetic flux of the vehicle chassis has been compensated for.

13. An electronic compass system as claimed in claim 12, wherein said microprocessor comprises program-controlled steering means to direct said serial data stream either to said digital to analog converter or to said digital display means depending on whether the microprocessor is in the calibration mode or in the direction-of-travel indicating mode, so as to insure supply of serial data streams to said digital-to-analog converter and to said display means, respectively, at the appropriate times.

14. An electronic compass system as claimed in claim 11, wherein the excitation pulses supplied to the excitation winding of said flux-gate-sensor are synchronized by a master clock signal supplied by said microprocessor.

15. An electronic compass system as claimed in claim 14, wherein said excitation winding is driven by a drive amplifier comprising a wave form generator, wherein said display means includes a digital display device and a display driver connected to and driving said device, and wherein a first conductor carrying said clock signal as well as a second conductor carrying said serial data streams are connected to both said drive amplifier and said display driver.

16. An electronic compass system as claimed in claim 11, wherein said circuit mean further comprises two-channel voltage amplifying means for amplifying the output pulses of said output windings and two-channel sample and hold means coupled on the one hand to said amplifying means and on the other hand to said microprocessor, for sampling positive-going and negative-going peak values of said output pulses and for storing said peak values for a time sufficient for the microprocessor to complete an analog-to-digital conversion.

17. An electronic compass system as claimed in claim 16, wherein a hold timing circuit controlled by a clock signal of said microprocessor is connected to said two-channel sample and hold means to cause said sample and hold means to switch from sample mode to hold mode at a time coincident with the output pulses of said output windings reaching a peak value, taking the delay between the occurrence of rising as well as falling edges of the excitation pulses and the occurrence of the peak value of the output pulses into consideration.

18. An electronic compass system as claimed in claim 17, wherein said microprocessor comprises means controlled by the program to take, by way of said amplifying means and said sample and hold means, a first reading of the output pulses produced by the rising edge of any excitation pulse, and subsequently a second reading of the output pulse produced by the falling edge of said excitation pulse, and to thereafter compute the arithmetic average of the two readings, thereby to compensate for possible inaccuracies in the manufacture of the flux-fate-sensor.

* * * * *

UNITED STATES PATENT AND TRADEMARK OFFICE
CERTIFICATE OF CORRECTION

PATENT NO. : 5,090,231

DATED : Feb 25, 1992

INVENTOR(S) : GALLAGHER

It is certified that error appears in the above-identified patent and that said Letters Patent is hereby corrected as shown below:

<u>Claim 6</u>

Column 23, Line 1:
  That part reading "said circuit mans interconnecting" should read
    -- said circuit means interconnecting.--

Signed and Sealed this

Eighth Day of June, 1993

Attest:

MICHAEL K. KIRK

Attesting Officer        Acting Commissioner of Patents and Trademarks